US008429156B2

(12) United States Patent
Buchmueller et al.

(10) Patent No.: US 8,429,156 B2
(45) Date of Patent: Apr. 23, 2013

(54) SPATIAL ATTRIBUTE RANKING VALUE INDEX

(75) Inventors: Daniel Buchmueller, Seattle, WA (US); Michael Kroepfl, Bellevue, WA (US); Frederik Schaffalitzky, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 3 days.

(21) Appl. No.: 13/162,930

(22) Filed: Jun. 17, 2011

(65) Prior Publication Data

US 2012/0323931 A1   Dec. 20, 2012

(51) Int. Cl.
*G06F 17/30* (2006.01)

(52) U.S. Cl.
USPC ........... 707/724; 707/794; 345/427; 345/651; 382/154; 382/209

(58) Field of Classification Search .......... 707/748, 707/724, E17.018, 918, 919, 921, 743, 788, 707/E17.11; 345/427, 651; 715/790, 781; 382/209, 154, 105, 216, 100
See application file for complete search history.

(56) References Cited

U.S. PATENT DOCUMENTS

| 5,651,676 | A * | 7/1997 | Artwick ..................... 345/427 |
| 7,643,673 | B2 * | 1/2010 | Rohlf et al. ................. 382/154 |
| 7,739,304 | B2 | 6/2010 | Naaman et al. |
| 7,747,598 | B2 * | 6/2010 | Buron et al. ................. 707/724 |
| 7,912,837 | B2 * | 3/2011 | Buron et al. ................. 707/724 |
| 2007/0112729 | A1 | 5/2007 | Wiseman et al. |
| 2007/0250477 | A1 * | 10/2007 | Bailly ........................ 707/2 |
| 2008/0040301 | A1 * | 2/2008 | Sadagopan et al. ........ 706/16 |
| 2008/0069480 | A1 | 3/2008 | Aarabi et al. |
| 2008/0109761 | A1 * | 5/2008 | Stambaugh ................. 715/853 |
| 2008/0148175 | A1 * | 6/2008 | Naaman et al. ............. 715/781 |
| 2008/0154888 | A1 * | 6/2008 | Buron et al. ................. 707/5 |
| 2008/0243821 | A1 * | 10/2008 | Delli Santi et al. .......... 707/5 |
| 2009/0049408 | A1 * | 2/2009 | Naaman et al. ............. 715/835 |
| 2009/0083191 | A1 * | 3/2009 | Hammad ..................... 705/75 |
| 2009/0290812 | A1 * | 11/2009 | Naaman et al. ............. 382/305 |
| 2010/0076968 | A1 * | 3/2010 | Boyns et al. ................ 707/732 |
| 2010/0121844 | A1 | 5/2010 | Slaney et al. |
| 2010/0182430 | A1 * | 7/2010 | Kroepfl et al. .............. 348/148 |
| 2010/0228691 | A1 * | 9/2010 | Yang et al. .................. 706/12 |
| 2010/0257162 | A1 * | 10/2010 | Buron et al. ............. 707/E17.017 |

(Continued)

OTHER PUBLICATIONS

Livia Hollenstein—"Capturing Vernacular Geography from Georeferenced Tags"—Institute of Geography University of Zurich—Nov. 2008—Ggeo.uzh.ch—(pp. 1-139).*

(Continued)

*Primary Examiner* — Anh Ly

(57) ABSTRACT

A request may be received that includes an indicator associated with a geographic location and scope. A database search may be initiated, based on the geographic location and scope. A list of one or more tags may be received, the tags associated with the geographic location, ordered based on relevance within the geographic scope, based on tag locale rankings associated with each of the tags included in the list of tags, the tag locale rankings based on comparisons of relative frequencies of occurrence of the tags, based on first bounded geographic areas, compared with second relative frequencies of occurrence of the tags based on second bounded geographic areas that are respectively larger than the first bounded geographic areas, the request geographic scope indicating one of a plurality of hierarchical geographic analysis levels associated with a plurality of geographic locations.

20 Claims, 14 Drawing Sheets

U.S. PATENT DOCUMENTS

| | | | | |
|---|---|---|---|---|
| 2011/0173572 | A1* | 7/2011 | van Zwol et al. | 715/856 |
| 2011/0286660 | A1* | 11/2011 | Ofek et al. | 382/154 |
| 2012/0155778 | A1* | 6/2012 | Buchmueller et al. | 382/209 |
| 2012/0284256 | A1* | 11/2012 | Mahajan et al. | 707/E17.018 |

OTHER PUBLICATIONS

Jae-min Kim—"Integrated Information System Supporting Energy Action Planning via the Internet"—Energy Systems Research Unit Department of Mechanical Engineering University of Strathclyde, Glasgow, UK—Jan. 2004—(pp. 1-342).*

Yin, et al., "Diversified Trajectory Pattern Ranking in Geo-Tagged Social Media", Retreived Mar. 24, 2011 at <<http://www.cs.uiuc.edu/~hanj/pdf/sdm11_zyin.pdf22 >. Proc. of 2011 SIAM Conf. on Data Mining (SDM'11), Phoenix, AZ., Apr. 2011, 12 Pages.

Choudhury, et al., "Enrichment and Ranking of the YouTube Tag Space and Integration with the Linked Data Cloud", Retreived Mar. 24, 2011 at <<http://data.semanticweb.org/pdfs/iswc/2009/in-use/paper171.pdf>>, 8th International Semantic Web Conference (ISWC 2009), Washington, DC, USA, Oct. 27, 2009, pp. 735-750.

Liu, et al., "Tag Ranking", Retreived Mar. 24, 2011 at <<http://www2009.eprints.org/36/1/p351.pdf>>, WWW 2009, Apr. 20-24, 2009, pp. 351-360.

Kroepfl et al., "Efficiently Locating Photographs in Many Panoramas," Retrieved Jun. 17, 2011 at <<http://research.microsoft.com/pubs/149302/Kroepfl_MatchingUserPhotos.pdf>>, ACM GIS '10, Nov. 2-5, 2010, 10 Pages.

Arcas, Blaise, "Read/Write World", Retrieved Jun. 17, 2011 at <<http://www.youtube.com/watch?v=4x9u4JG9H6E>>, Apr. 20, 2011, 2 Pages.

"Read/Write World", Retrieved Jun. 17, 2011 at <<http://readwriteworld.cloudapp.net/>>, Microsoft, Apr. 19-Jun. 12, 2011, 3 Pages.

Schwartz, Joe, "Bing Maps Tile System," Retrived Jun. 17, 2011 at <<http://msdn.microsoft.com/en-us/library/bb259689.aspx>>, Microsoft, 2011, 11 Pages.

"Flickr," Retrieved Jun. 17, 2011 at <<http://www.flickr.com>>, Yahoo!, 2011, 2 Pages.

"Facebook," Retrieved Jun. 17, 2011 at http://www.facebook.com>>, Facebook, 2011 Page.

"Photobucket", Retreived Jun. 17, 2011 at <<http:www.photobucket.com>>, Photobucket Corporation, 2011, 1 Page.

"Tag Maps," Retrieved Jun. 17, 2011 at <<http://tagmaps.research.yahoo.com/>>, Yahoo! Research Berkeley, 2006, 3 Pages.

Buchmueller et al., "Spatial Image Index and Associated Updating Functionality,", U.S. Appl. No. 12/969,610, filed Dec. 16, 2010, 55 Pages.

* cited by examiner (3A)
↓

---
312 — The entity associated with the one of the geographic locations includes an indicator of a digital image associated with the one of the geographic locations, and the one or more attributes associated with the each tag include one or more of a name associated with a posting user of one or more of the digital images, a description of a camera, a description of an event, an description of a mood, a name of a color, a name associated with an item depicted in one or more of the digital images, a name associated with a group of items depicted in one or more of the digital images, or a date associated with one or more of the digital images (3B)
↓

314 — Initiate storage of the first locale ranking value with an indicator of the first tag in a quad tree structure that includes a plurality of other locale ranking values and indicators of associated tags, stored based on relevance based on the first geographic scope

FIG. 3b

| Σ 3631073 | 706 | Frequency |
|---|---|---|
| 239479 | Seattle | 6.595% |
| 121539 | Washington | 3.347% |
| 28711 | wa | 0.791% |
| 23332 | USA | 0.643% |
| 22116 | United States | 0.609% |
| 18668 | Nikon | 0.514% |
| 14373 | fremont | 0.396% |
| 13801 | geotagged | 0.380% |
| 12688 | music | 0.349% |
| 12070 | 2010 | 0.332% |
| 11719 | party | 0.323% |
| 10158 | Eye-Fi | 0.280% |
| 10004 | iphone | 0.276% |
| 9924 | canon | 0.273% |
| 9122 | 2008 | 0.251% |
| 8816 | 2007 | 0.243% |
| 8512 | 2009 | 0.234% |
| 8510 | art | 0.234% |
| 8464 | downtown | 0.233% |
| 8457 | tacoma | 0.233% |
| 8139 | WASHINGTON STA | 0.224% |
| 8118 | concept | 0.224% |
| 7928 | water | 0.218% |
| 7702 | park | 0.212% |
| 7673 | parade | 0.211% |
| 7240 | wedding | 0.199% |
| 7008 | D70s | 0.193% |
| 6573 | Convention | 0.181% |
| 6498 | bar | 0.179% |
| 6493 | roller derby | 0.179% |
| 6287 | rollergirls | 0.173% |
| 6279 | space needle | 0.173% |
| 6145 | burlesque | 0.169% |
| 6040 | Live | 0.166% |
| 5985 | cameraphone | 0.165% |
| 5983 | roller skating | 0.165% |
| 5965 | snow | 0.164% |
| 5932 | Night | 0.163% |
| 5930 | Seattle Center | 0.163% |
| 5925 | nikkor | 0.163% |
| 5694 | pax | 0.157% |
| 5671 | food | 0.156% |
| 5530 | me | 0.152% |
| 5359 | redmond | 0.148% |
| 5353 | 2006 | 0.147% |
| 5300 | Ballard | 0.146% |
| 5211 | bellevue | 0.144% |
| 5180 | graffiti | 0.143% |
| 5067 | Olympia | 0.140% |
| 5066 | architecture | 0.140% |
| 5016 | pike place market | 0.138% |
| 5000 | nature | 0.138% |
| 4972 | film | 0.137% |
| 4924 | rat city rollergirls | 0.136% |

700a

Seattle Tag Statistics

Quad tile: 0212300

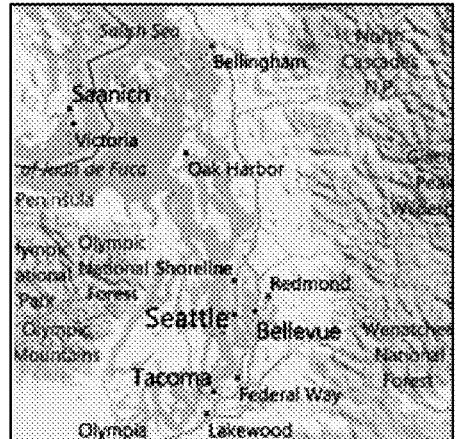

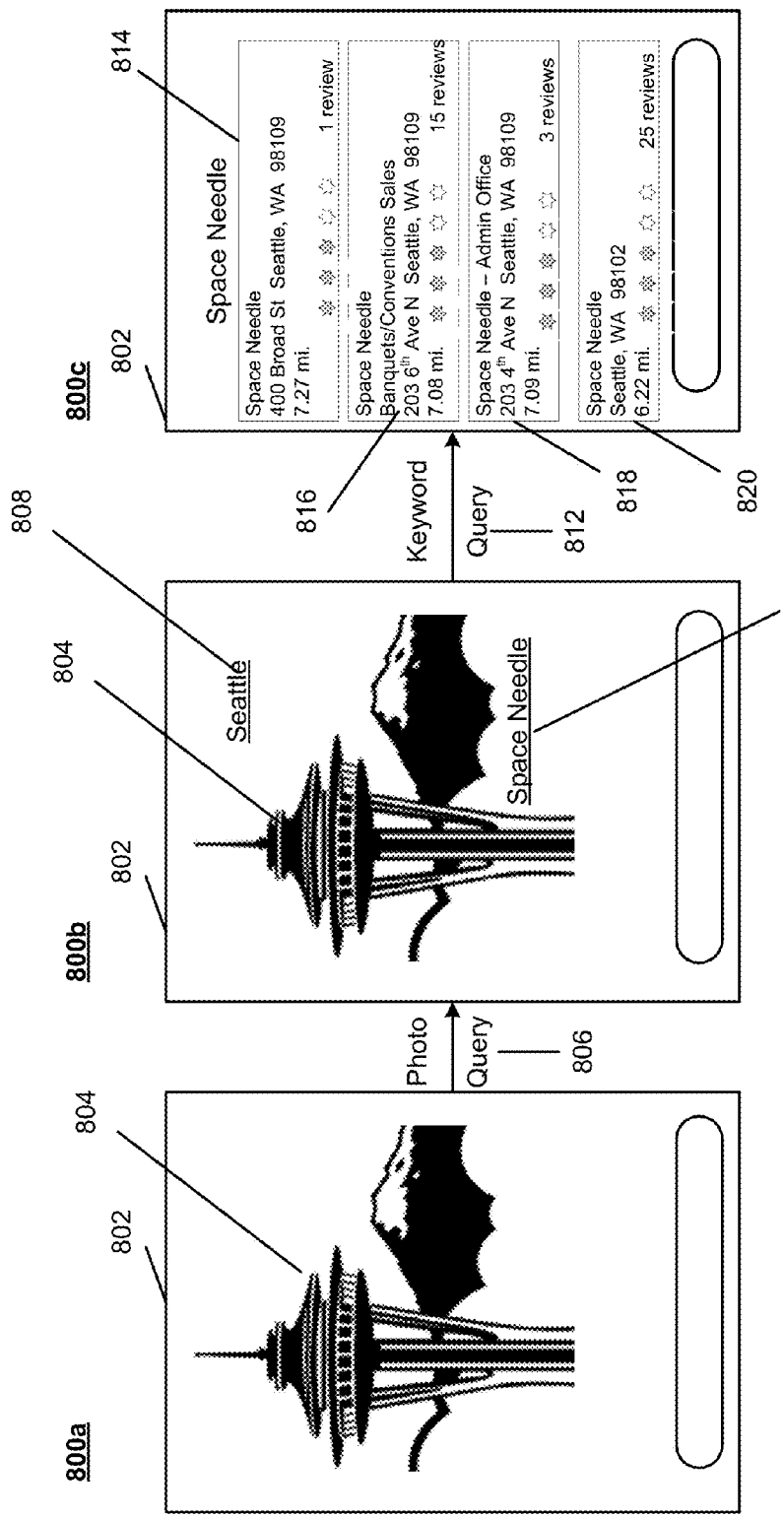

SPATIAL ATTRIBUTE RANKING VALUE INDEX

BACKGROUND

Many databases exist for users to store and share information such as digital images (e.g., digital photos in systems such as FLICKR). In many systems, the users may also include information (e.g., tags) associated with the digital images. For example, the information may include names or types of entities pictured in a digital image (e.g., names of people, places, buildings, artwork, animals, objects), descriptions of locations associated with the digital image, names and types of cameras, user name, dates, colors, moods, names of groups associated with an entity depicted in the digital image, and other attributes associated with the digital image.

Many image databases also provide searching capabilities. For example, a search based on the keyword "Seattle" may return many suggestions of images that have been tagged as being associated with "Seattle", potentially including images associated with a race horse named "Seattle Slew". Such a suggestion may be irrelevant for a user desiring images associated with a city in the state of Washington. Searches based on locations may return many different types of suggestions, including images of group outings, weddings, and other images associated with the requested location query. Searches based on images may return suggestions of images associated with entities from around the world. Searches based on matching images may return suggestions of any type of tag that may be stored in association with similar images (e.g., camera type, date, title indicating wedding site for a tag contributor).

SUMMARY

According to one general aspect, a tag relevance manager may include a tag collector configured to obtain a plurality of tags associated with a plurality of geographic locations, each tag indicating one or more attributes associated with an entity associated with one of the geographic locations. The tag relevance manager may also include a geographic scope component that obtains a first geographic scope indicating a first hierarchical geographic analysis level associated with the plurality of geographic locations. The tag relevance manager may also include a first frequency component that obtains a first relative frequency of occurrence of a first one of the tags based on a first bounded geographic area that includes a first one of the geographic locations that is associated with the first one of the tags and a second frequency component that obtains a second relative frequency of occurrence of the first one of the tags based on a second bounded geographic area that is larger than the first bounded geographic area, the second bounded geographic area surrounding the first one of the geographic locations that is associated with the first one of the tags. The tag relevance manager may also include a tag ranking component that determines, via a device processor, a first locale ranking value associated with the first tag indicating a relevance of the first tag based on the first geographic scope, the first and second relative frequencies of occurrence, and a locale associated with the first bounded geographic area.

According to another aspect, a request may be received that includes an indicator associated with a request geographic location and a request geographic scope. A search of a database may be initiated based on the request geographic location and the request geographic scope. A list of one or more tags associated with the request geographic location may be received, ordered based on relevance within the request geographic scope, based on tag locale rankings associated with each of the tags included in the list of tags, the tag locale rankings based on comparisons of relative frequencies of occurrence of the tags, based on first bounded geographic areas, compared with second relative frequencies of occurrence of the tags based on second bounded geographic areas that are respectively larger than the first bounded geographic areas, the request geographic scope indicating one of a plurality of hierarchical geographic analysis levels associated with a plurality of geographic locations.

According to another aspect, a computer program product tangibly embodied on a computer-readable storage medium may include executable code that, when executed, may cause at least one data processing apparatus to receive a user request for a list of one or more attributes associated with a geographic location and a geographic scope. Further, the at least one data processing apparatus may send a device request that includes the user request for the list and indicators associated with the geographic location and the geographic scope. Further, the at least one data processing apparatus may receive the list of attributes associated with the geographic location, ordered based on relevance within the geographic scope, based on attribute locale rankings associated with each of the attributes included in the list of attributes, the attribute locale rankings based on comparisons of relative frequencies of occurrence of the attributes, based on first bounded geographic areas, compared with second relative frequencies of occurrence of the attributes based on second bounded geographic areas that are respectively larger than the first bounded geographic areas, the geographic scope indicating one of a plurality of hierarchical geographic analysis levels associated with a plurality of geographic locations.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 3a-3d are a flowchart illustrating example operations of the system of FIG. 1.

FIGS. 7a-7b depict example statistics associated with geographic areas having different hierarchical geographic scopes.

FIGS. 8a-8c depict example user views of example graphical displays on a device.

DETAILED DESCRIPTION

Figure 1:
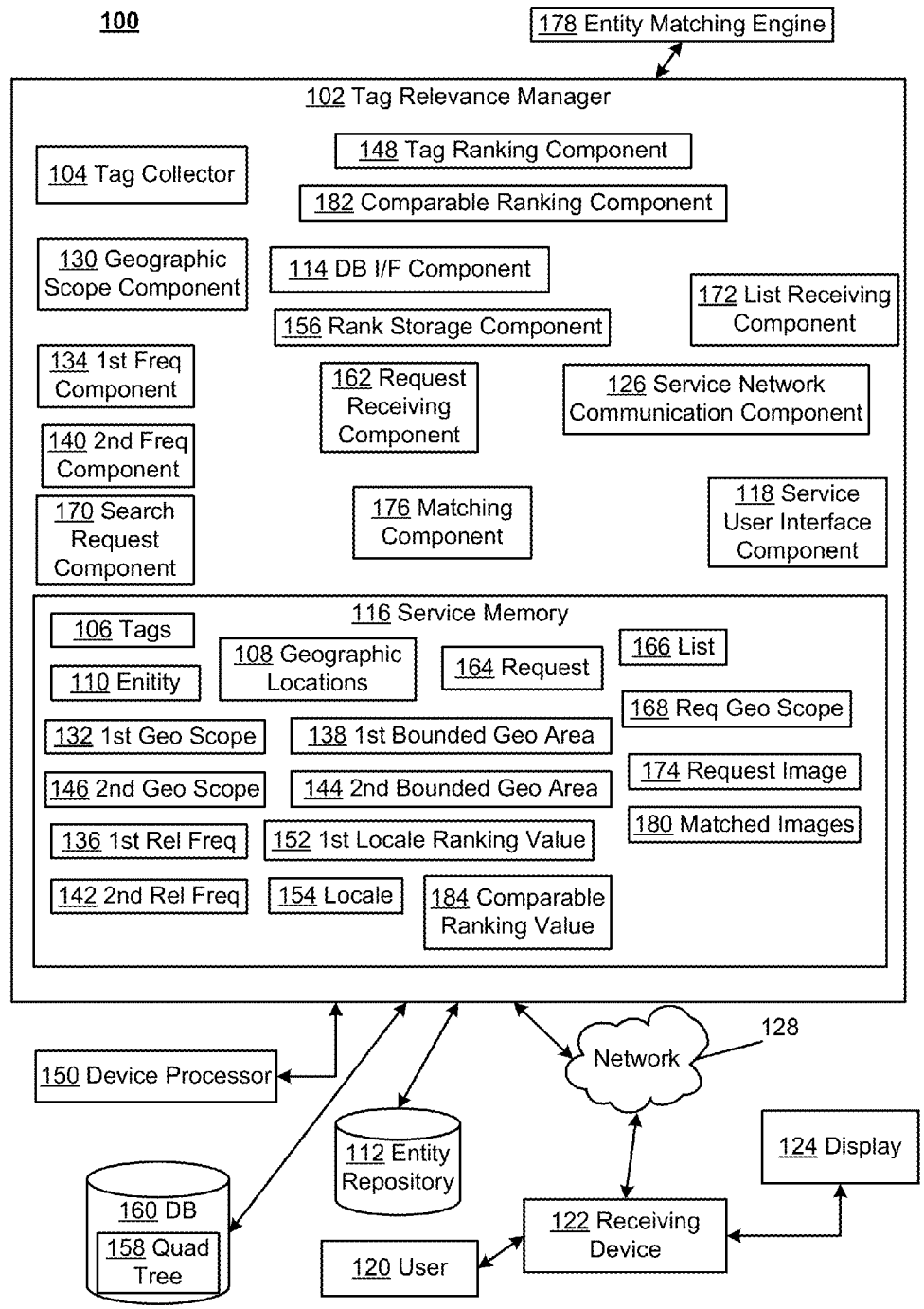
FIG. 1 is a block diagram of an example system for managing tag relevance.

Many users of databases for storage and sharing of entities such as images (e.g., FLICKR) may add attributes, or tags, to their photos to describe properties such as camera model, user name, mood, and colors, as well as places and subjects in the images (e.g., a "soup of tags"), providing a heterogeneous collection of keywords. The keywords in such databases may typically include briefly worded tags (e.g., one word or only a few words per tag).

Example techniques discussed herein may provide ranking values for tags associated with a location, based on a predetermined geographic scale and geographic area, in comparison with a larger geographic scale and geographic area. According to an example embodiment, a determination of a ranking value of a tag may be based on a frequency of occurrence of the tag for a current geographic location and hierarchical geographic scope, compared to a frequency of occurrence of the tag for a larger geographic area (e.g., a geographic area surrounding the current geographic location that has a larger hierarchical scope). For example, a tag "downtown" may receive a higher ranking value in a hierarchical geographic scope that is associated with a detail zoom level on a map that indicates city names (or neighborhood level names), as compared with a larger hierarchical geographic scope associated with a larger geographic area that includes a whole continent.

Thus, according to an example embodiment, locally relevant keywords, or tags, may be determined and ranked based on a large set of user-contributed (e.g., photo) annotations. According to an example embodiment, these ranked tags may be retrieved for a user based on input values such as location (e.g., latitude/longitude) and hierarchical geographic scope (e.g., city block zoom level, state zoom level, country zoom level, world zoom level) in real-time.

According to an example embodiment, a set of relevant tags may be determined for an image-based query based on a database that includes match-graph-related user-contributed tags.

According to an example embodiment, techniques discussed herein may determine a ranking value associated with a tag based on a local tag occurrence's first derivation (e.g., as a ratio of a relative frequency of the tag in a first geographic area and a relative frequency of the tag in a second geographic area associated with a larger hierarchical geographic scope) multiplied by a tag density in an associated local geographic area. This metric may be applied to any location and geographic scope, but may become computationally expensive as more images and tags are added to the system. According to an example embodiment, a quad tree structure may be employed to store tag ranking values for location area tiles for different hierarchical geographic scopes (e.g., zoom levels) for optimization and for pre-computation or caching of the ranking values.

According to an example embodiment, the spatial keyword score index discussed herein may be used with a crawling and fetching system that indexes user-contributed images. According to an example embodiment, the spatial keyword score index discussed herein may be used with systems such as those discussed in commonly assigned and co-pending "Spatial Image Index and Associated Updating Functionality" to Buchmueller et al., U.S. patent application Ser. No. 12/969,610, filed Dec. 16, 2010, which is hereby incorporated by reference herein in its entirety. For example, such systems may index geo-located electronic images (e.g., digital photos) in databases such as FLICKR. For example, such systems may index image files (e.g., photos), as well as indexing metadata such as dates, rights, user names, and tags. For example, such systems may be used for matching an image (e.g., a photo) against a corpus of other images, for determining matching images. For example, such systems may be used for determining matching images based on location information indicating locations within bounded geographic areas.

As discussed above, many users of databases for storage and sharing of images (e.g., FLICKR) may add tags to their photos, thus providing a heterogeneous collection of keywords. For example, by using an indexing system (e.g., as discussed in U.S. patent application Ser. No. 12/969,610 mentioned above) for matching images and example techniques as discussed herein for determining tag ranking values, clusters or graphs of the matched images may be generated, based on the matched images determined by the indexing system. According to an example embodiment, a match graph of digital images (e.g., photos) may provide a graph of sets of tags, as many of the images stored in such databases are associated with tags. For example, the graph of sets of tags may provide indications of which images may be related, based on tag relevance ranking values that may be determined by example techniques discussed herein.

According to an example embodiment, in order to evaluate a local relevance for a tag X within a geographic area A (which may be located within a larger area A+), a local relevance score $S_{X_A}$ may correspond to the ratio of the relative frequency of tag X in area A, indicated as $f_{X_A}$, and the relative frequency of tag X in area A+, indicated as $f_{X_{A+}}$, which may be indicated more formally as:

$$S_{X_A} = \frac{f_{X_A}}{f_{X_{A+}}} \tag{1}$$

According to an example embodiment, a relative tag frequency for a tag X in area A may be determined as a ratio of a number of independent occurrences of the tag X in A, indicated as $n_{X_A}$ and a total number of independent tags in A, indicated as $N_A$, which may be indicated more formally as:

$$f_{X_A} = \frac{n_{X_A}}{N_A} = \frac{n_{X_A}}{\sum_Y n_{Y_A}} \tag{2}$$

In this context, "independent" tags may refer to tags that occur within the same area which are statistically not related to each other by circumstances other than a capture location and time of the associated image. According to an example embodiment, a tag used multiple times by the same user in that area may be considered only once for computing the tag ranking value, in order to reduce a risk of spam induced by single users (e.g., a user using a locally irrelevant tag such as his/her user name or pet name for multiple images). For example, the areas A and A+ may have a significantly different hierarchical geographic scope, as discussed further below.

Thus, as shown in Equation (2), $$N_A = \Sigma_Y n_{Y_A} \tag{3}$$

wherein Y may represent all different tags occurring within Area A.

According to an example embodiment, an actual number of tags occurring within a certain area may be used to determine the tag frequencies as well as the local tag ranking value.

According to an example embodiment, a density weight factor may be used to determine globally comparable ranking values. For example, the comparison of the frequencies as discussed above may isolate ranking values in their relevance to particular quads in a quad tree structure. However, a globally comparable ranking value $S_{X_A}$ may be determined based on multiplying the core ranking value with the density of the quad, indicated as $$\frac{N_A}{\overline{N}},$$

the globally comparable ranking value indicated more formally as:

$$S'_{X_A} = S_{X_A} \cdot \frac{N_A}{\overline{N}} \quad (4)$$

The density factor $$\frac{N_A}{\overline{N}}$$

may be determined as a total number of tags in A, indicated as $N_A$, divided by an average number of tags per quad tile at a zoom level of A, indicated as $\overline{N}$, as discussed further below.

As further discussed herein, FIG. 1 is a block diagram of a system 100 for managing tag relevance. As shown in FIG. 1, a system 100 may include a tag relevance manager 102 that includes a tag collector 104 that obtains a plurality of tags 106 associated with a plurality of geographic locations 108, each tag 106 indicating one or more attributes associated with an entity 110 associated with one of the geographic locations 108. In this context, a "tag" may refer to a label or description (e.g., a descriptive word or phrase) that is associated with an entity (e.g., a location, geographic area, mood, artwork, person, animal, electronic file, image). For example, a person posting a photo as a digital image in an image database may provide descriptive terms for identifying the photo, or for conveying a meaning of the photo to other users of the image database, or for refreshing the memory of the photo contributor at a later date, with regard to features associated with the photo, from the perspective of the photo contributor. For example, the tag relevance manager 102 may provide services relating to providing information that may be considered relevant to searches initiated by users.

According to an example embodiment, the tag relevance manager 102 may be embodied via executable instructions that may be stored on a computer-readable storage medium, as discussed below. According to an example embodiment, the computer-readable storage medium may include any number of storage devices, and any number of storage media types, including distributed and mobile devices.

For example, an entity repository 112 may include such an image database, and may be accessed via a database interface component 114. For example, the database interface component 114 may obtain the tags 106 from one or more entity repositories 112 that include entities stored with information that includes tags. One skilled in the art of data processing will appreciate that there are many techniques for storing repository information discussed herein, such as various types of database configurations (e.g., MICROSOFT SQL SERVER) and non-database configurations.

According to an example embodiment, the tag relevance manager 102 may include a service memory 116 that may store the tags 106. In this context, a "memory" may include a single memory device or multiple memory devices configured to store data and/or instructions. Further, the service memory 116 may span multiple distributed storage devices.

According to an example embodiment, a service user interface component 118 may manage communications between a user 120 and the tag relevance manager 102. The user 120 may be associated with a receiving device 122 that may be associated with a display 124 and other input/output devices. For example, the display 124 may be configured to communicate with the receiving device 122, via internal device bus communications, or via at least one network connection.

According to an example embodiment, the tag relevance manager 102 may include a service network communication component 126 that may manage network communication between the tag relevance manager 102 and other entities that may communicate with the tag relevance manager 102 via at least one network 128. For example, the at least one network 128 may include at least one of the Internet, at least one wireless network, or at least one wired network. For example, the at least one network 128 may include a cellular network, a radio network, or any type of network that may support transmission of data for the tag relevance manager 102. For example, the service network communication component 126 may manage network communications between the tag relevance manager 102 and the receiving device 122. For example, the service network communication component 126 may manage network communication between the service user interface component 118 and the receiving device 122.

A first frequency component 134 may obtain a first relative frequency 136 of occurrence of a first one of the tags 106 based on a first bounded geographic area 138 that includes a first one of the geographic locations that is associated with the first one of the tags. A second frequency component 140 may obtain a second relative frequency 142 of occurrence of the first one of the tags 106 based on a second bounded geographic area 144 that is larger than the first bounded geographic area 138, the second bounded geographic area 144 surrounding the first one of the geographic locations that is associated with the first one of the tags 106. Although the first frequency component 134 and the second frequency component 140 are depicted separately in FIG. 1, one skilled in the art of data processing will appreciate that they may be implemented as a single component, and/or as distributed units.

A tag ranking component 148 may determine, via a device processor 150, a first locale ranking value 152 associated with the first tag indicating a relevance of the first tag based on the first geographic scope 132, the first and second relative frequencies 136, 142 of occurrence, and a locale 154 associated with the first bounded geographic area 138.

In this context, a "processor" may include a single processor or multiple processors configured to process instructions associated with a processing system. A processor may thus include multiple processors processing instructions in parallel and/or in a distributed manner. Although the device processor 150 is depicted as external to the tag relevance manager 102 in FIG. 1, one skilled in the art of data processing will appreciate that the device processor 150 may be implemented as a single component, and/or as distributed units which may be located internally or externally to the tag relevance manager 102, and/or any of its elements.

In this context, a "locale" may include a geographic location and an area surrounding the location, or associated with the location. For example, a locale may include a geographic area that may be determined as relevant to an entity (e.g., a landmark, a person, an event). For example, a locale may include a geographic area within a predetermined distance of a geographic location, or within a predetermined bounded geographic area, or bounding or overlapping with a predetermined bounded geographic area.

According to an example embodiment, the entity 110 associated with the one of the geographic locations 108 may include an indicator of a digital image associated with the one of the geographic locations 108.

According to an example embodiment, the one or more attributes associated with the each tag may include one or more of a name associated with a posting user of one or more of the digital images, a description of a camera, a description of an event, an description of a mood, a name of a color, a name associated with an item depicted in one or more of the digital images, a name associated with a group of items depicted in one or more of the digital images, or a date associated with one or more of the digital images.

According to an example embodiment, a rank storage component 156 may initiate storage of the first locale ranking value 152 with an indicator of the first tag in a quad tree structure 158 that includes a plurality of other locale ranking values and indicators of associated tags, stored based on relevance based on the first geographic scope. For example, the quad tree structure 158 may be stored in a database 160.

According to an example embodiment, a quadkey system may be used as the quad tree structure for storing the ranking values. For example, such quadkey systems may include web mapping services such as MICROSOFT's BING MAPS tiling scheme. According to an example embodiment, the same quad system may be used for location, and the respective zoom level of a quad may be used for hierarchical geographic scope.

For example, MICROSOFT's BING MAPS provides a world map that users can directly manipulate to pan and zoom. To aid in speed and responsiveness of this interaction, maps may be pre-rendered at many different levels of detail (e.g., hierarchical geographic scope). Each map is divided into tiles for quick retrieval and display.

For example, at a lowest level of detail (Level 1), a map may be represented as 512×512 pixels. At each successive level of detail, the map width and height may increase by a factor of 2: Level 2 represented as 1024×1024 pixels, Level 3 represented as 2048×2048 pixels, Level 4 represented as 4096×4096 pixels, and so on. To optimize the performance of map retrieval and display, the rendered map may be cut into tiles of 256×256 pixels each. As the number of pixels differs at each level of detail, so does the number of tiles.

According to an example embodiment, for optimizing the indexing and storage of tiles, the two-dimensional tile XY coordinates and the zoom levels may be converted into one-dimensional strings called quadtree keys, or "quadkeys". Each quadkey may thus identify a single tile at a predetermined level of detail, and may be used as a key, for example, in database B-tree indexes. According to an example embodiment, for converting tile coordinates into a quadkey, the bits of the Y and X coordinates may be interleaved, and the result may be interpreted as a base-4 number (with leading zeros maintained) and converted into a string.

According to an example embodiment, the length of a quadkey (the number of digits) may equal the level of detail of the corresponding tile. Further, the numeric representation of a quadkey of any tile may begin with the quadkey of its parent tile (e.g., a containing tile at the previous level).

According to an example embodiment, the rank storage component 156 may initiate storage of the first locale ranking value 152 with an indicator of the first tag in the database 160 that includes a plurality of other locale ranking values and indicators of associated tags, stored based on relevance, based on the first geographic scope 132.

According to an example embodiment, the database 160 may include a plurality of entities associated with the plurality of geographic locations 108, and each of the plurality of tags 106 may be associated with one or more of the plurality of entities.

According to an example embodiment, a request receiving component 162 may receive a request 164 for a list 166 of tags associated with one of the plurality of geographic locations 108, based on a request geographic scope 168.

According to an example embodiment, the one of the geographic locations 108 may be obtained from the user 120 or from a device associated with the user 120. For example, the computing devices associated with users may include Global Positioning System (GPS) functionality that may provide geographic coordinates for determining locations. As another example, the user 120 may provide location information, or location information may be determined based on an Internet Protocol (IP) address on a network. The location information may also be determined from an analysis of the signal strength and timing of signals received from wireless station locations if the computing device associated with the user 120 is utilizing wireless communications.

For example, the user 120 may provide information indicating the request geographic scope 168 based on zoom levels employed by the user 120, or requested by the user 120.

According to an example embodiment, a search request component 170 may initiate a search of the database 160 based on the one of the plurality of geographic locations 108 and the request geographic scope 168.

According to an example embodiment, a list receiving component 172 may receive the list 166 of tags, ordered based on relevance within the request geographic scope 168, based on tag locale rankings associated with each of the tags included in the list 166 of tags.

According to an example embodiment, the request receiving component 172 may receive the request 164 for a list 166 of tags associated with one of the plurality of geographic locations 108, based on a request geographic scope 168 and a request image 174 associated with the one of the one of the plurality of geographic locations 108.

According to an example embodiment, the search request component 170 may initiate a search of the database 160 based on the one of the plurality of geographic locations 108, a match of the request image 174 with other images, and the request geographic scope 168. For example, a matching component 176 may initiate a request for a match via an entity matching engine 178.

For example, the entity matching engine 178 may include a system implemented in accordance with those discussed in commonly assigned and co-pending "Spatial Image Index and Associated Updating Functionality" to Buchmueller et al., U.S. patent application Ser. No. 12/969,610, filed Dec. 16, 2010, as discussed above.

According to an example embodiment, the list receiving component 172 may receive the list 166 of tags based on receiving one or more indicators associated with matched images 180 associated with one or more of the tags 106 included in the received list 166, the matched images 180 associated with the plurality of geographic locations 108.

According to an example embodiment, the first bounded geographic area 138 may include at least a first portion of the plurality of geographic locations 108, and the second bounded geographic area 144 may include at least a second portion of the plurality of geographic locations 108.

According to an example embodiment, the second bounded geographic area 144 may include the first bounded geographic area 138.

According to an example embodiment, the second bounded geographic area 144 may substantially geographically surround the first bounded geographic area 138.

According to an example embodiment, the first relative frequency 136 of occurrence of the first one of the tags 106 may be determined in accordance with $$f_{X_A} = \frac{n_{X_A}}{N_A} = \frac{n_{X_A}}{\sum_Y n_{Y_A}}$$

wherein
X represents the first one of the tags,
A represents the first bounded geographic area 138,
$n_{X_A}$ represents a number of independent occurrences of the first tag X in A,
$N_A$ represents a total number of independent tags in A, and
$f_{X_A}$ represents the first relative frequency 136 of occurrence.

According to an example embodiment, the first locale ranking value 152 may be determined in accordance with $$S_{X_A} = \frac{f_{X_A}}{f_{X_{A+}}}$$

wherein
X represents the first one of the tags,
A represents the first bounded geographic area 138,
A+ represents the second bounded geographic area 144,
$S_{X_A}$ represents the first locale ranking value 152,
$f_{X_A}$ represents the first relative frequency 136 of occurrence, and
$f_{X_{A+}}$ represents the second relative frequency 142 of occurrence.

According to an example embodiment, a comparable ranking component 182 may determine a globally comparable ranking value 184 in accordance with $$S'_{X_A} = S_{X_A} \cdot \frac{N_A}{\overline{N}}$$

wherein
X represents the first one of the tags,
A represents the first bounded geographic area 138,
$S_{X_A}$ represents the first locale ranking value 152,
$N_A$ represents a total number of tags in A,
$\overline{N}$ represents an average number of tags per quadkey tile at the first geographic scope 132, $$\frac{N_A}{\overline{N}}$$

represents a density factor, and
$S'_{X_A}$ represents the globally comparable ranking value 184.

Figure 2:
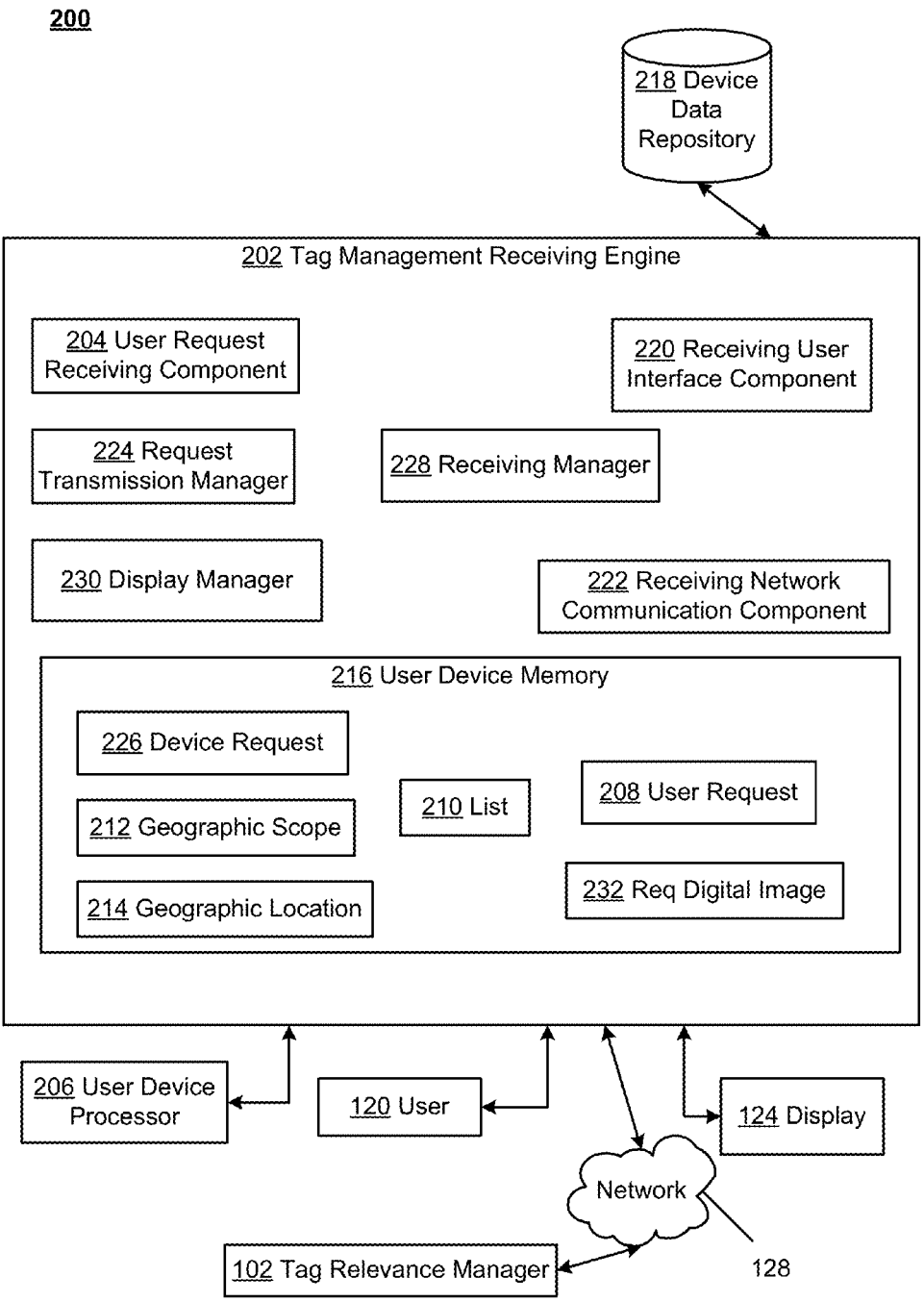
FIG. 2 is a block diagram of an example system for managing tag relevance.

FIG. 2 is a block diagram of an example system for managing tag relevance. For example, the system of FIG. 2 may include the receiving device 122 discussed above with regard to FIG. 1. As shown in FIG. 2, a system 200 may include a tag management receiving engine 202 that may include a user request receiving component 204 that may receive, via a user device processor 206, a user request 208 for a list 210 of one or more attributes associated with a geographic scope 212 and a geographic location 214.

For example, the user 120 may provide an input indicating the user request 208 via an input device associated with the tag management receiving engine 202 (e.g., a keyboard, touchpad, touchscreen, mouse click, audio input device for receiving voice input), the request input received by the user request receiving component 204.

According to an example embodiment, a user device memory 216 may be configured to store the user request 208. According to an example embodiment, a device data repository 218 may be configured to persistently store data associated with the tag management receiving engine 202. For example, the device data repository 218 may be located on a disk drive or other storage medium associated with the tag management receiving engine 202.

According to an example embodiment, a receiving user interface component 220 may manage communications between the user 120 and the tag management receiving engine 202. For example, the display 124 may communicate with the tag management receiving engine 202, via internal device bus communications, or via at least one network connection.

According to an example embodiment, the tag management receiving engine 202 may include a receiving network communication component 222 that may manage network communication between the tag management receiving engine 202 and other entities that may communicate with the tag management receiving engine 202 via at least one network 128. For example, the at least one network 128 may include at least one of the Internet, at least one wireless network, or at least one wired network. For example, the at least one network 128 may include a cellular network, a radio network, or any type of network that may support transmission data for the tag management receiving engine 202. For example, the receiving network communication component 222 may manage network communications between the tag management receiving engine 202 and the tag relevance manager 102. For example, the receiving network communication component 222 may manage network communication between the receiving user interface component 220 and the tag relevance manager 102.

A request transmission manager 224 may send a device request 226 that includes the user request 208 for the list 210 and indicators associated with the geographic scope 212 and the geographic location 214.

A receiving manager 228 may receive the list 210 of attributes associated with the geographic location 214, ordered based on relevance within the geographic scope 212, based on attribute locale rankings associated with each of the attributes included in the list 210 of attributes, the attribute locale rankings based on comparisons of relative frequencies of occurrence of the attributes, based on first bounded geographic areas, compared with second relative frequencies of occurrence of the attributes based on second bounded geographic areas that are respectively larger than the first bounded geographic areas, the geographic scope indicating one of a plurality of hierarchical geographic analysis levels associated with a plurality of geographic locations.

According to an example embodiment, a display manager 230 may initiate a display of the list 210 of attributes associated with the geographic location 214, ordered based on relevance within the geographic scope 212.

According to an example embodiment, the user request receiving component 204 may receive the user request 208 based on receiving the user request 208 for a list 210 of one or more attributes associated with the geographic scope 212, a request digital image 232, and the geographic location 214.

According to an example embodiment, the request transmission manager 224 may send the device request 226 based on sending the device request 226 that includes the user request 208 for the list 210 and indicators associated with the geographic scope 212, the request digital image 232, and the geographic location 214.

According to an example embodiment, the receiving manager 228 may receive the list 210 of attributes associated with the geographic location 214 and the request digital image 232, ordered based on relevance within the geographic scope 212, based on attribute locale rankings associated with each of the attributes included in the list 210 of attributes, the attribute locale rankings based on comparisons of relative frequencies of occurrence of the attributes, based on the first bounded geographic areas, compared with second relative frequencies of occurrence of the attributes based on the second bounded geographic areas.

Figure 3A:
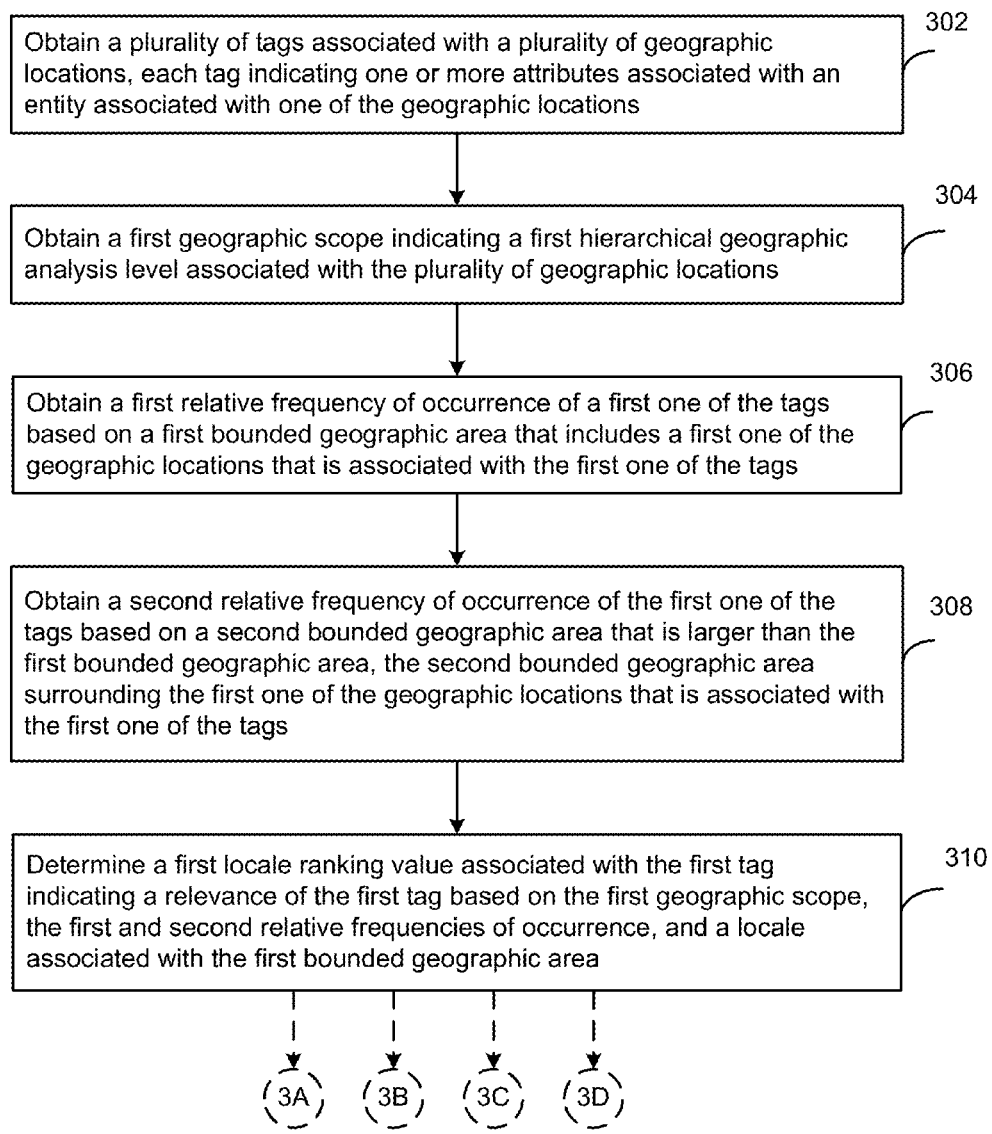
Figure 3C:
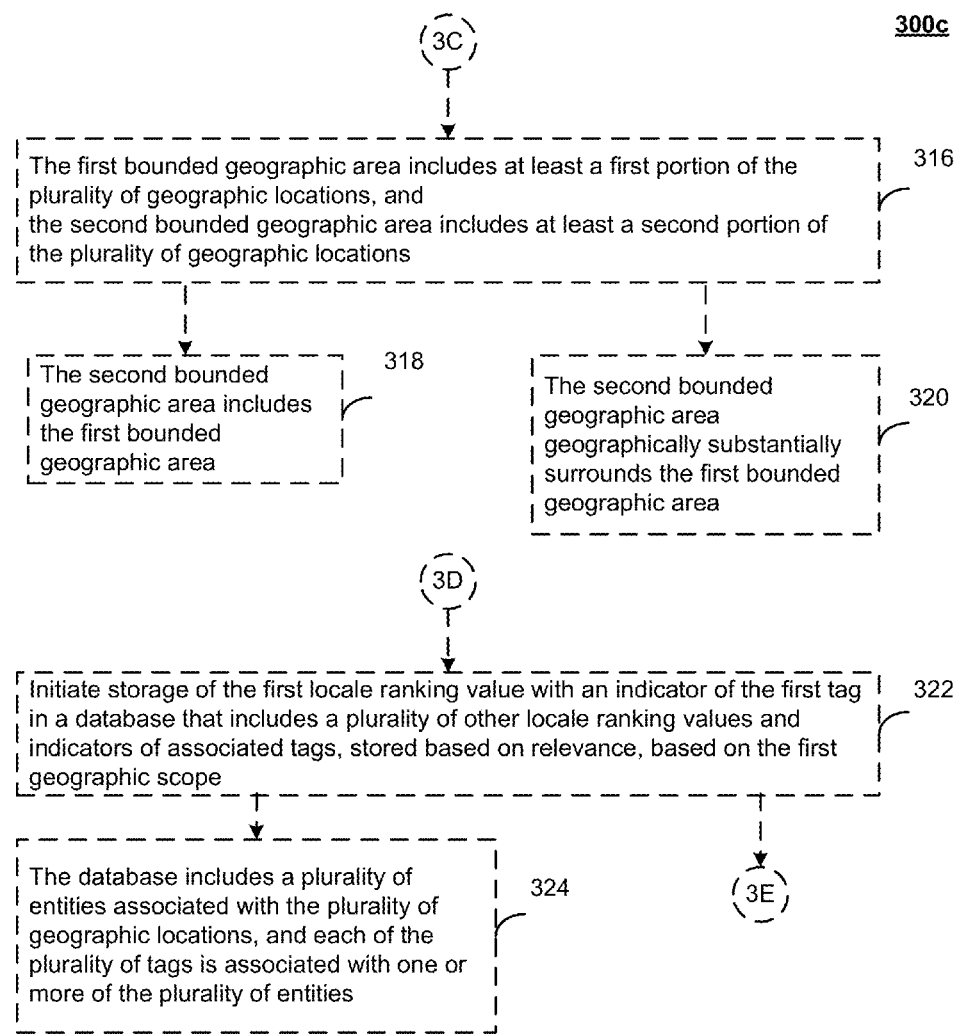
Figure 3D:
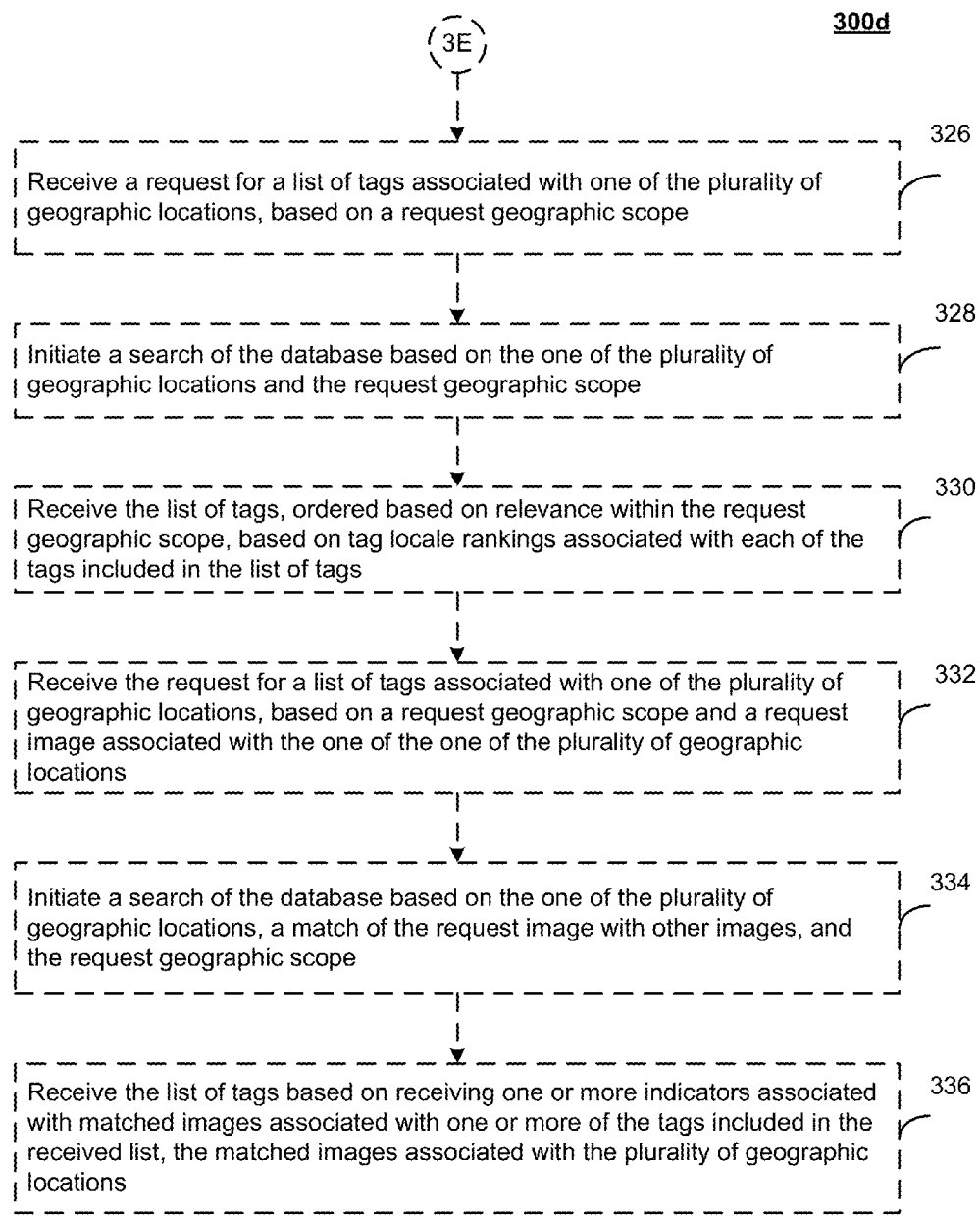

FIGS. 3a-3d are a flowchart illustrating example operations of the system of FIG. 1, according to example embodiments. In the example of FIG. 3a, a plurality of tags associated with a plurality of geographic locations may be obtained, each tag indicating one or more attributes associated with an entity associated with one of the geographic locations (302). For example, the tag collector 104 may obtain a plurality of tags 106 associated with a plurality of geographic locations 108, each tag 106 indicating one or more attributes associated with an entity 110 associated with one of the geographic locations 108, as discussed above.

A first geographic scope indicating a first hierarchical geographic analysis level associated with the plurality of geographic locations may be obtained (304). For example, the geographic scope component 130 may obtain a first geographic scope 132 indicating a first hierarchical geographic analysis level associated with the plurality of geographic locations 108, as discussed above.

A first relative frequency of occurrence of a first one of the tags may be obtained based on a first bounded geographic area that includes a first one of the geographic locations that is associated with the first one of the tags (306). For example, the first frequency component 134 may obtain the first relative frequency 136 of occurrence of the first one of the tags 106 based on the first bounded geographic area 138, as discussed above.

A second relative frequency of occurrence of the first one of the tags may be obtained based on a second bounded geographic area that is larger than the first bounded geographic area, the second bounded geographic area surrounding the first one of the geographic locations that is associated with the first one of the tags (308). For example, the second frequency component 140 may obtain the second relative frequency 142 of occurrence of the first one of the tags 106 based on the second bounded geographic area 144, as discussed above.

A first locale ranking value associated with the first tag indicating a relevance of the first tag based on the first geographic scope, the first and second relative frequencies of occurrence, and a locale associated with the first bounded geographic area may be determined (310). For example, the tag ranking component 148 may determine, via the device processor 150, the first locale ranking value 152 associated with the first tag indicating a relevance of the first tag based on the first geographic scope 132, the first and second relative frequencies 136, 142 of occurrence, and a locale 154 associated with the first bounded geographic area 138, as discussed above.

According to an example embodiment, the entity associated with the one of the geographic locations may include an indicator of a digital image associated with the one of the geographic locations, and the one or more attributes associated with the each tag include one or more of a name associated with a posting user of one or more of the digital images, a description of a camera, a description of an event, an description of a mood, a name of a color, a name associated with an item depicted in one or more of the digital images, a name associated with a group of items depicted in one or more of the digital images, or a date associated with one or more of the digital images (312).

According to an example embodiment, storage of the first locale ranking value with an indicator of the first tag may be initiated, in a quad tree structure that includes a plurality of other locale ranking values and indicators of associated tags, stored based on relevance based on the first geographic scope (314). For example, the rank storage component 156 may initiate storage of the first locale ranking value 152 with an indicator of the first tag in a quad tree structure 158 that includes a plurality of other locale ranking values and indicators of associated tags, stored based on relevance based on the first geographic scope, as discussed above.

According to an example embodiment, the first bounded geographic area may include at least a first portion of the plurality of geographic locations, and the second bounded geographic area includes at least a second portion of the plurality of geographic locations (316).

According to an example embodiment, the second bounded geographic area may include the first bounded geographic area (318). According to an example embodiment, the second bounded geographic area may geographically substantially surround the first bounded geographic area (320).

According to an example embodiment, storage of the first locale ranking value with an indicator of the first tag may be initiated, in a database that includes a plurality of other locale ranking values and indicators of associated tags, stored based on relevance based on the first geographic scope (322). For example, the rank storage component 156 may initiate storage of the first locale ranking value 152 with an indicator of the first tag in the database 160 that includes a plurality of other locale ranking values and indicators of associated tags, stored based on relevance, based on the first geographic scope 132, as discussed above.

According to an example embodiment, the database may include a plurality of entities associated with the plurality of geographic locations, and each of the plurality of tags may be associated with one or more of the plurality of entities (324). For example, the database 160 may include a plurality of entities associated with the plurality of geographic locations 108, and each of the plurality of tags 106 may be associated with one or more of the plurality of entities.

According to an example embodiment, a request may be received for a list of tags associated with one of the plurality of geographic locations, based on a request geographic scope (326). For example, the request receiving component 162 may receive a request 164 for a list 166 of tags associated with one of the plurality of geographic locations 108, based on a request geographic scope 168, as discussed above.

According to an example embodiment, a search of the database may be initiated based on the one of the plurality of geographic locations and the request geographic scope (328). For example, the search request component 170 may initiate a search of the database 160 based on the one of the plurality of geographic locations 108 and the request geographic scope 168, as discussed above.

According to an example embodiment, the list of tags may be received, the list ordered based on relevance within the request geographic scope, based on tag locale rankings associated with each of the tags included in the list of tags (330). For example, the list receiving component 172 may receive the list 166 of tags, ordered based on relevance within the request geographic scope 168, based on tag locale rankings associated with each of the tags included in the list 166 of tags, as discussed above.

According to an example embodiment, the request may be received for a list of tags associated with one of the plurality of geographic locations, based on a request geographic scope and a request image associated with the one of the one of the plurality of geographic locations (332). For example, the request receiving component 172 may receive the request 164 for a list 166 of tags associated with one of the plurality of geographic locations 108, based on a request geographic scope 168 and a request image 174 associated with the one of the one of the plurality of geographic locations 108, as discussed above.

According to an example embodiment, a search of the database may be initiated based on the one of the plurality of geographic locations, a match of the request image with other images, and the request geographic scope (334). For example, the search request component 170 may initiate a search of the database 160 based on the one of the plurality of geographic locations 108, a match of the request image 174 with other images, and the request geographic scope 168, as discussed above.

According to an example embodiment, the list of tags may be received based on receiving one or more indicators associated with matched images associated with one or more of the tags included in the received list, the matched images associated with the plurality of geographic locations (336). For example, the list receiving component 172 may receive the list 166 of tags based on receiving one or more indicators associated with matched images 180 associated with one or more of the tags 106 included in the received list 166, the matched images 180 associated with the plurality of geographic locations 108, as discussed above.

Figure 4A:
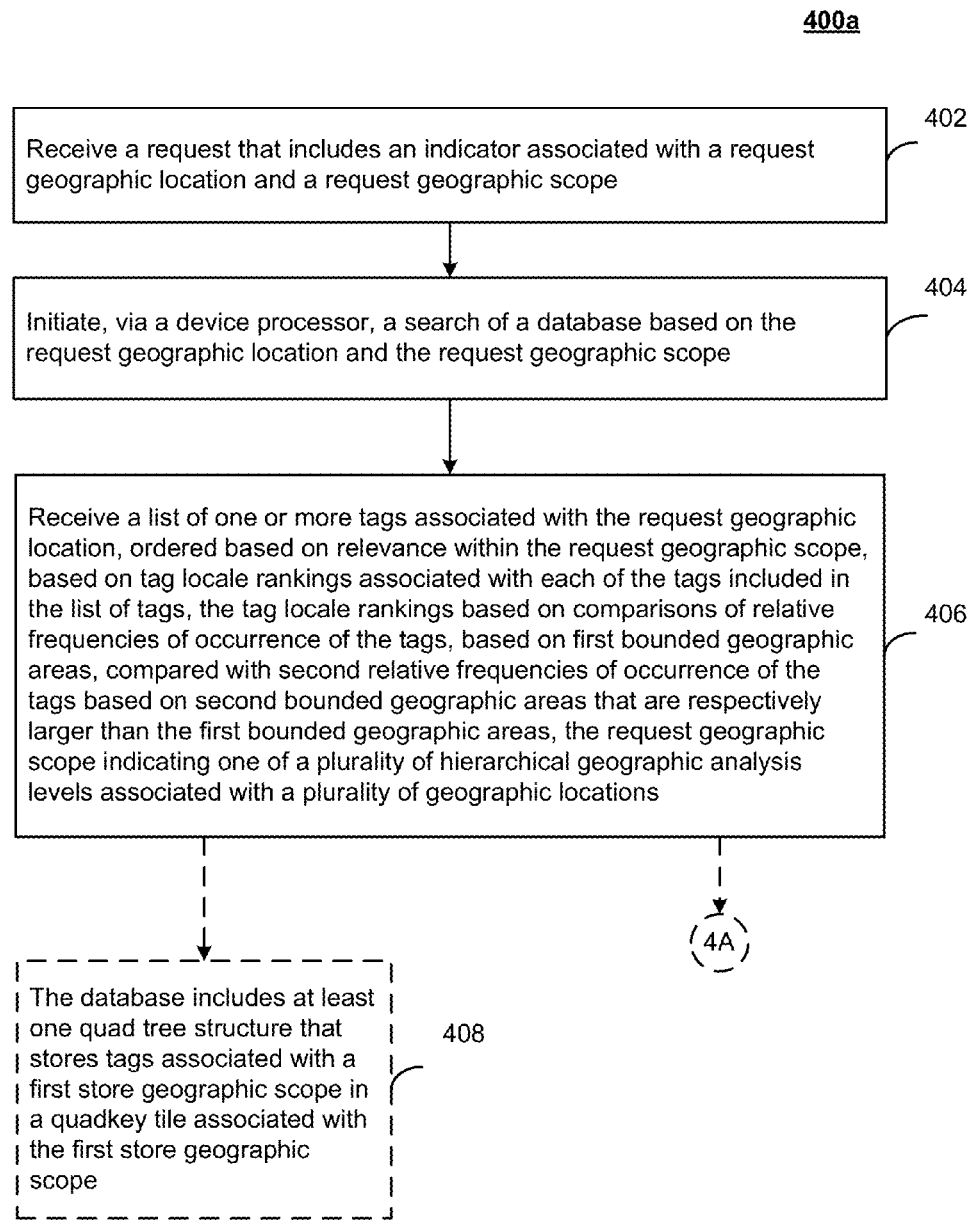
FIGS. 4a-4b are a flowchart illustrating example operations of the system of FIG. 1.
Figure 4B:
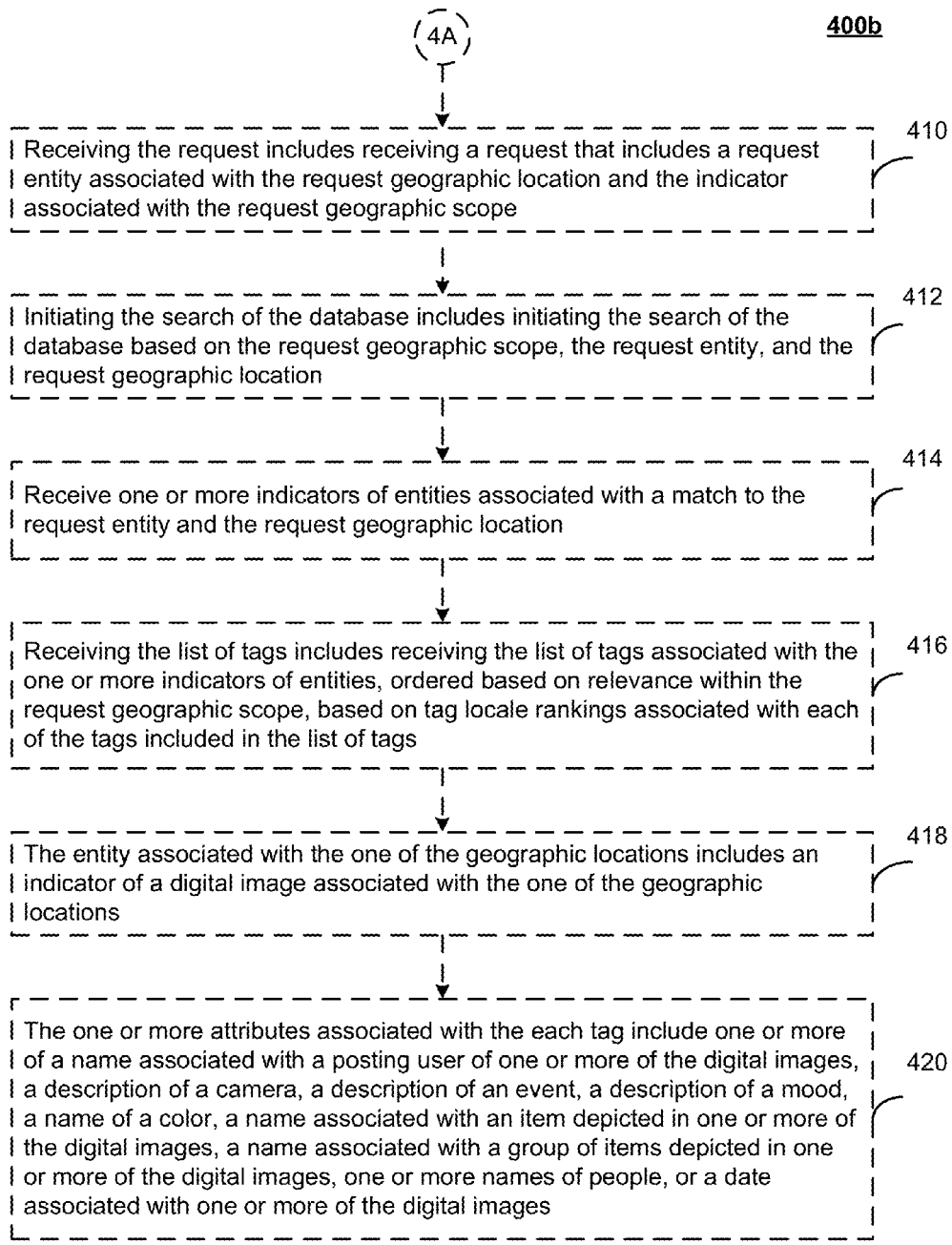

FIGS. 4a-4b are a flowchart illustrating example operations of the system of FIG. 1, according to example embodiments. In the example of FIG. 4a, a request that includes an indicator associated with a request geographic location and a request geographic scope may be received (402). For example, the request receiving component 162, as discussed above, may receive the request 164.

A search of a database, via a device processor, may be initiated based on the request geographic location and the request geographic scope (404). For example, the search request component 170 may initiate a search of the database 160 based on the one of the plurality of geographic locations 108 and the request geographic scope 168, as discussed above.

A list of one or more tags associated with the request geographic location may be received, the list ordered based on relevance within the request geographic scope, based on tag locale rankings associated with each of the tags included in the list of tags, the tag locale rankings based on comparisons of relative frequencies of occurrence of the tags, based on first bounded geographic areas, compared with second relative frequencies of occurrence of the tags based on second bounded geographic areas that are respectively larger than the first bounded geographic areas, the request geographic scope indicating one of a plurality of hierarchical geographic analysis levels associated with a plurality of geographic locations (406). For example, the list receiving component 172 may receive the list 166 of tags, ordered based on relevance within the request geographic scope 168, based on tag locale rankings associated with each of the tags included in the list 166 of tags, as discussed above.

According to an example embodiment, the database may include at least one quad tree structure that stores tags associated with a first store geographic scope in a quadkey tile associated with the first store geographic scope (408).

According to an example embodiment, receiving the request may include receiving a request that includes a request entity associated with the request geographic location and the indicator associated with the request geographic scope (410). For example, the request receiving component 172 may receive the request 164 for a list 166 of tags associated with one of the plurality of geographic locations 108, based on a request geographic scope 168 and a request image 174 associated with the one of the one of the plurality of geographic locations 108, as discussed above.

According to an example embodiment, initiating the search of the database may include initiating the search of the database based on the request geographic scope, the request entity, and the request geographic location (412). For example, the search request component 170 may initiate a search of the database 160 based on the one of the plurality of geographic locations 108, a match of the request image 174 with other images, and the request geographic scope 168, as discussed above.

According to an example embodiment, one or more indicators of entities associated with a match to the request entity and the request geographic location may be received (414). For example, the list receiving component 172 may receive the list 166 of tags based on receiving one or more indicators associated with matched images 180 associated with one or more of the tags 106 included in the received list 166, the matched images 180 associated with the plurality of geographic locations 108, as discussed above.

According to an example embodiment, receiving the list of tags may include receiving the list of tags associated with the one or more indicators of entities, ordered based on relevance within the request geographic scope, based on tag locale rankings associated with each of the tags included in the list of tags (416). According to an example embodiment, the entity associated with the one of the geographic locations may include an indicator of a digital image associated with the one of the geographic locations (418).

According to an example embodiment, the one or more attributes associated with the each tag may include one or more of a name associated with a posting user of one or more of the digital images, a description of a camera, a description of an event, a description of a mood, a name of a color, a name associated with an item depicted in one or more of the digital images, a name associated with a group of items depicted in one or more of the digital images, one or more names of people, or a date associated with one or more of the digital images (420).

Figure 5A:
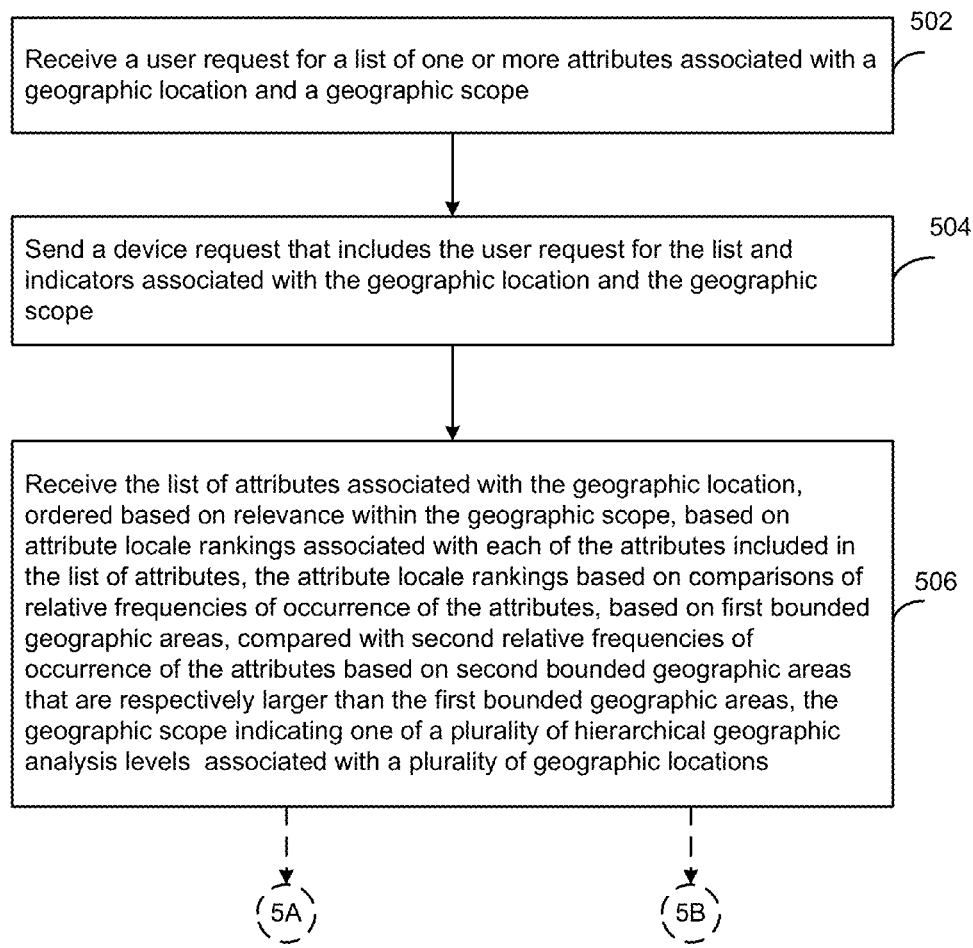
FIGS. 5a-5b are a flowchart illustrating example operations of the system of FIG. 2.
Figure 5B:
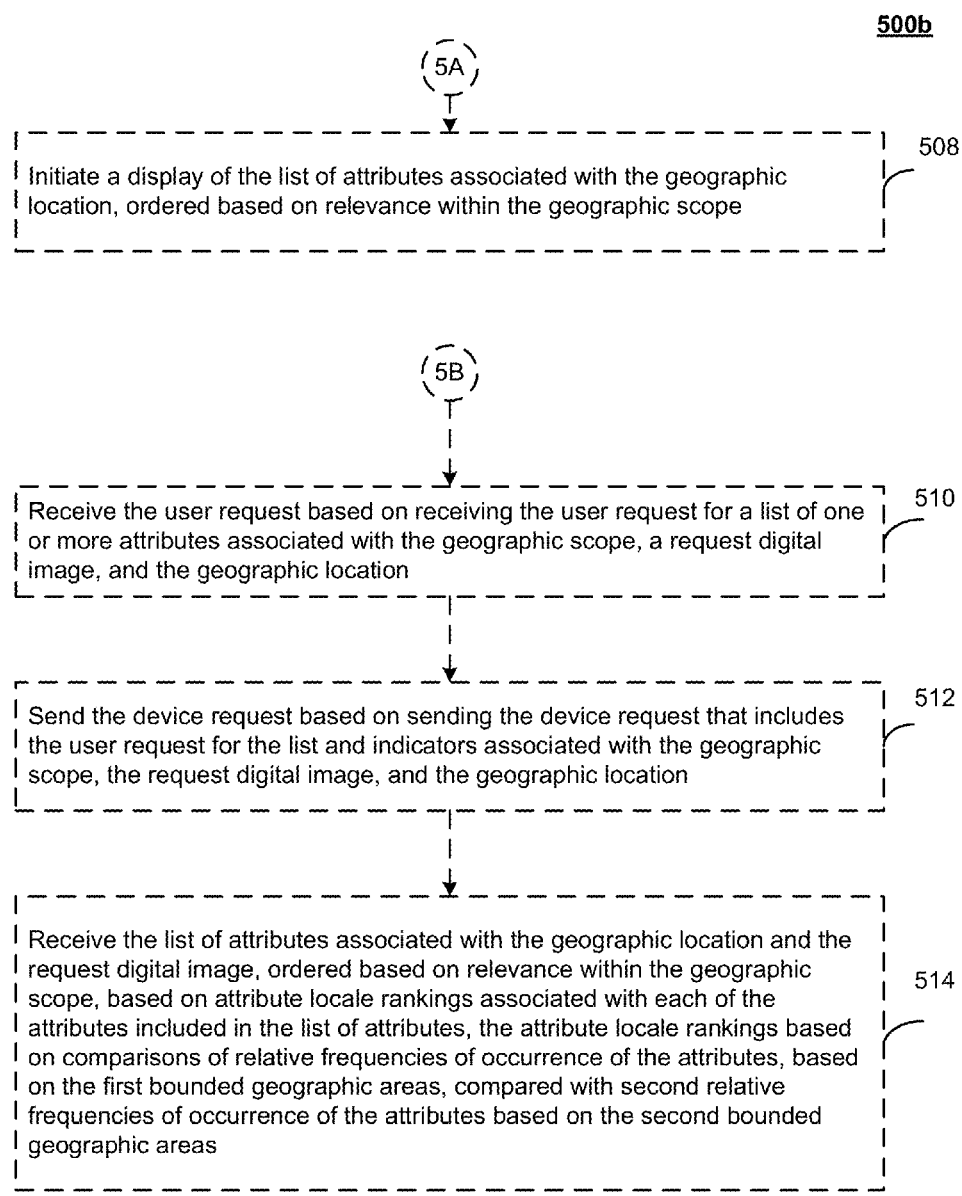

FIGS. 5a-5b are a flowchart illustrating example operations of the system of FIG. 2, according to example embodiments. In the example of FIG. 5a, a user request for a list of one or more attributes associated with a geographic scope and a geographic location may be received (502).

For example, the user request receiving component 204 may receive, via a user device processor 206, a user request 208 for a list 210 of one or more attributes associated with a geographic location 214 and a geographic scope 212, as discussed above.

A device request that includes the user request for the list and indicators associated with the geographic location and the geographic scope may be sent (504).

For example, the request transmission manager 224 may send a device request 226 that includes the user request 208 for the list 210 and indicators associated with the geographic scope 212 and the geographic location 214, as discussed above.

The list of attributes associated with the geographic location may be received, the list ordered based on relevance within the geographic scope, based on attribute locale rankings associated with each of the attributes included in the list of attributes, the attribute locale rankings based on comparisons of relative frequencies of occurrence of the attributes, based on first bounded geographic areas, compared with second relative frequencies of occurrence of the attributes based on second bounded geographic areas that are respectively larger than the first bounded geographic areas, the geographic scope indicating one of a plurality of hierarchical geographic analysis levels associated with a plurality of geographic locations (506).

For example, the receiving manager 228 may receive the list 210 of attributes associated with the geographic location 214, ordered based on relevance within the geographic scope 212, based on attribute locale rankings associated with each of the attributes included in the list 210 of attributes, the attribute locale rankings based on comparisons of relative frequencies of occurrence of the attributes, based on first bounded geographic areas, as discussed above.

According to an example embodiment, a display of the list of attributes associated with the geographic location may be initiated, the list ordered based on relevance within the geographic scope (508).

For example, the display manager 230 may initiate a display of the list 210 of attributes associated with the geographic location 214, ordered based on relevance within the geographic scope 212, as discussed above.

According to an example embodiment, the user request may be received based on receiving the user request for a list of one or more attributes associated with the geographic scope, a request digital image, and the geographic location (510). For example, the user request receiving component 204 may receive the user request 208 based on receiving the user request 208 for a list 210 of one or more attributes associated with the geographic scope 212, a request digital image 232, and the geographic location 214, as discussed above.

According to an example embodiment, the device request may be sent based on sending the device request that includes the user request for the list and indicators associated with the geographic scope, the request digital image, and the geographic location (512). For example, the request transmission manager 224 may send the device request 226 based on sending the device request 226 that includes the user request 208 for the list 210 and indicators associated with the geographic scope 212, the request digital image 232, and the geographic location 214, as discussed above.

According to an example embodiment, the list of attributes associated with the geographic location and the request digital image may be received, the list ordered based on relevance within the geographic scope, based on attribute locale rankings associated with each of the attributes included in the list of attributes, the attribute locale rankings based on comparisons of relative frequencies of occurrence of the attributes, based on the first bounded geographic areas, compared with second relative frequencies of occurrence of the attributes based on the second bounded geographic areas (514).

For example, the receiving manager 228 may receive the list 210 of attributes associated with the geographic location 214 and the request digital image 232, ordered based on relevance within the geographic scope 212, based on attribute locale rankings associated with each of the attributes included in the list 210 of attributes, the attribute locale rankings based on comparisons of relative frequencies of occurrence of the attributes, based on the first bounded geographic areas, compared with second relative frequencies of occurrence of the attributes based on the second bounded geographic areas, as discussed above.

According to an example embodiment, structure and relevance may be extracted from tags associated with entities such as digital images. According to an example embodiment, user-contributed tags may be mined to provide canonical descriptions of places. According to an example embodiment, techniques discussed herein may provide a scalar ranking value per tag, per geographic location, and per hierarchical geographic scope.

For example, the tag "Seattle" may seem relevant for a point (e.g., based on latitude/longitude) in downtown Seattle, but the relevance of the tag may also depend on the hierarchical geographic scope (e.g., zoom level). For example, when looking at an overhead map of the United States, a user may wish to see the label "Seattle" represented. However, by zooming in to the level of Seattle's Pike Place Market in downtown Seattle, the user may view a zoomed-in map of Seattle and labels of tourist attractions may become more relevant on the map, from the user's perspective.

Figure 6A:
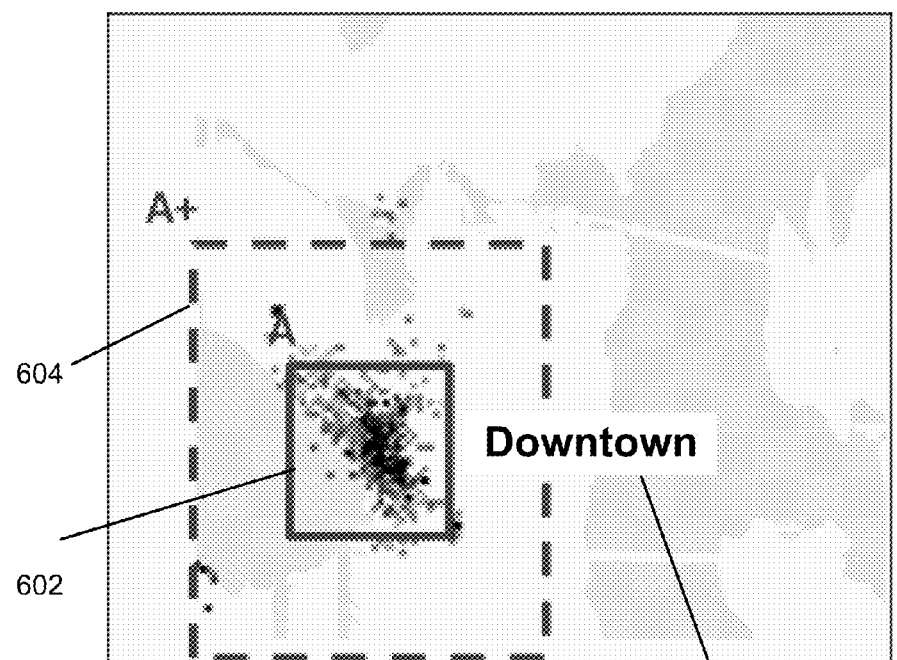
FIGS. 6a-6b depict example spatial distributions of different example tags.
Figure 6B:
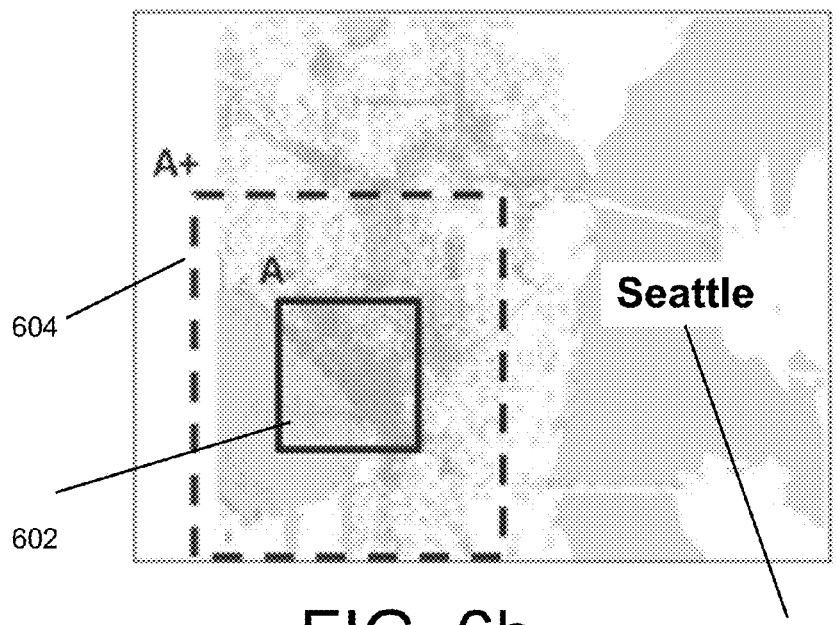

FIGS. 6a-6b depict example spatial distributions of different example tags. As shown in FIG. 6a, a geographic region 600a indicates a geographic area 602, marked A, and a geographic area 604, marked A+. A tag 606 indicated as "Downtown" appears primarily within the geographic area 602 marked A. However, in FIG. 6b, a tag 608 indicated as "Seattle" appears with roughly equal probability (tag frequency) within the area A as within the larger area A+. For example, the area A+ may fully surround A and may be larger by some scale factor s.

Therefore the tag "Downtown" may be considered to be more relevant for region A than the tag "Seattle". However, when considering a larger hierarchical geographic scope (e.g., zoom level) of the map, the tag "Seattle" at some point may become a predominant, or more prominent, tag in one geographic area when compared to a surrounding geographic area.

Thus, according to an example embodiment, techniques discussed herein may determine a local tag relevance ranking value per location and hierarchical geographic scope (e.g., zoom level) and adjust the ranking value globally by density to provide globally comparable ranking values.

Figure 7B:
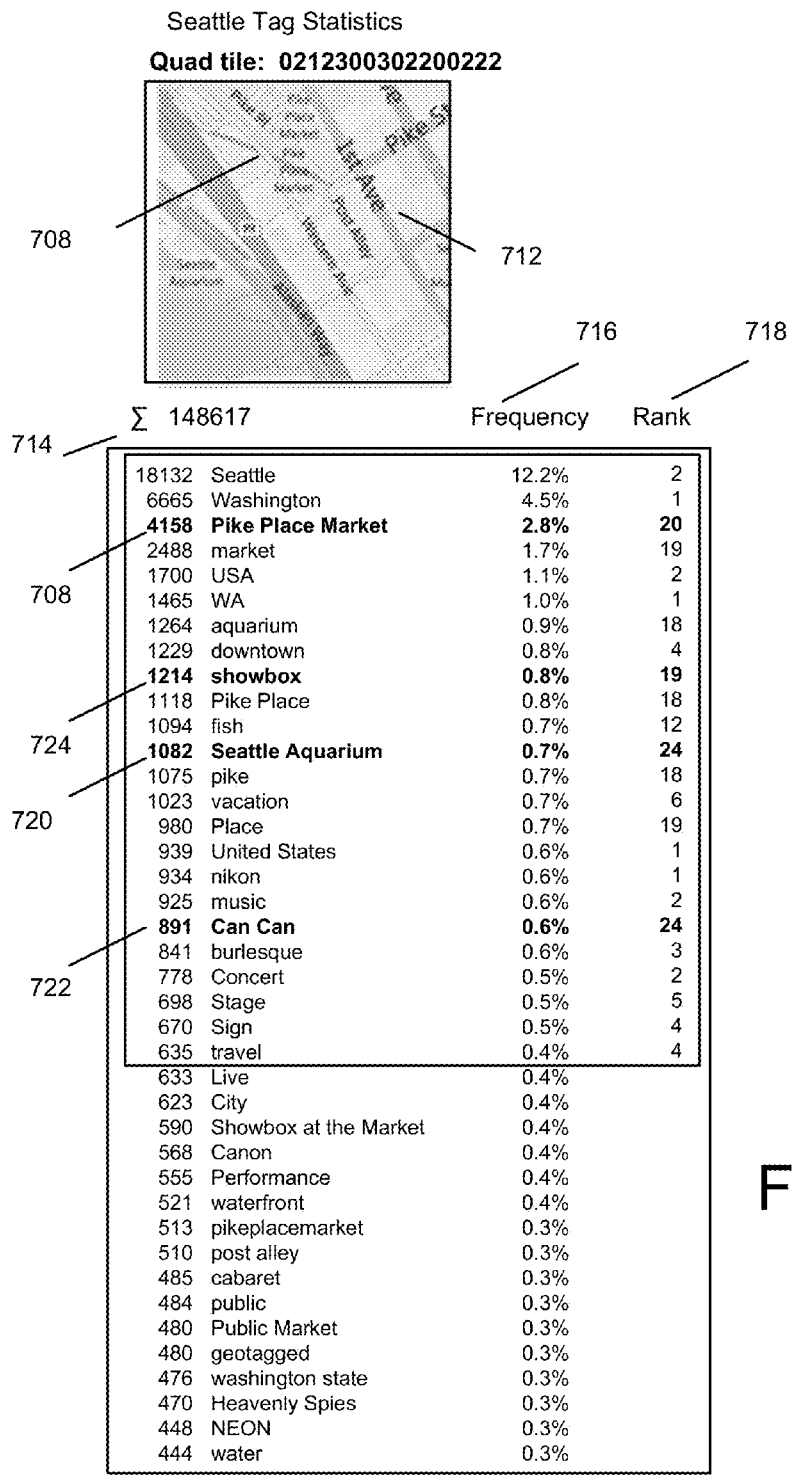

FIGS. 7a-7b depict example statistics associated with geographic areas having different hierarchical geographic scopes. In FIG. 7a, a geographic area 702 associated with a quad tile associated with quadkey "0212300" is shown. As shown in FIG. 7a, the geographic area 702 is associated with a hierarchical geographic scope (e.g., level 7) that may provide indications of city names, from a user perspective.

As shown in FIG. 7a, a total number of tags 704 in the quad "0212300" (level 7) is 3,631,073. A list of tags and their total number of occurrences, and frequency 706 are shown. A tag "Pike Place Market" 708 occurs 5,016 times in this quad, corresponding to a relative tag frequency $f_{X_A}$ of 0.138%.

In FIG. 7b, a geographic area 712 associated with a quad tile associated with quadkey "02123003022200222" is shown. As shown in FIG. 7b, the geographic area 712 is associated with a hierarchical geographic scope (e.g., level 17) that may provide indications of city streets and local landmarks, from a user perspective. As shown in FIG. 7b, a total number of tags 714 in the quad "02123003022200222" (level 17) is indicated as 148,617. A list of tags and their total number of occurrences, frequency 716, and rank value 718 are also shown.

As illustrated in FIGS. 7a-7b, geographic areas A+ (e.g., area 702) and A (e.g., area 712) have different hierarchical geographic scopes, corresponding to two tiles at different levels in a quad tree scheme (e.g., at levels 7 and 17, respectively). According to an example embodiment, an actual number of tags occurring within a geographic area may be used to determine the tag frequencies as well as the local tag ranking value.

As shown in FIG. 7b, the tag "Pike Place Market" 708 appears in the location of a landmark in downtown Seattle, at a geographic scope (e.g., zoom level) of 17, which may cover approximately 5 by 5 city blocks. As shown in FIG. 7a, the total number of tags 704 in the geographic area 702 (quad "0212300", Level 7) is indicated as 3,631,073. As shown in FIG. 7a, the tag "Pike Place Market" 708 occurs 5,016 times in the quad 702, corresponding to a relative tag frequency $f_{x_{A+}}$ of 0.138%. In contrast, in the geographic area 712 (quad: "0212300302200222", Level 17), the tag "Pike Place Market" 708, even though zoomed in several levels, occurs 4,158 times in a total 714 of 148,617 tags (e.g., $f_{x_A}$=2.8%), which may imply a local uniqueness of the tag "Pike Place Market" 708 in the quad associated with the geographic area 712. This relevance may be verified by analyzing the quad tile picture associated with the geographic area 712 and noting the label "Pike Place Market" 708 in the upper half of the quad. FIG. 7b illustrates the use of the tag frequencies of the two quads to calculate the ranking value 718, in this case 20.25 for the tag "Pike Place Market" 708. More examples for other tags are shown in FIG. 7b, where the local tag relevance score may be used to rank the tags accordingly. For the given area, the most relevant tags are shown as "Seattle Aquarium" 720, "Can Can" 722, "Pike Place Market" 708, and "Showbox" 724.

According to an example embodiment, a more precise but slightly more complex technique may employ a belt of surrounding quads including quad A at the same zoom level to form A+, thus ensuring a more homogeneous distribution of tag ranking values (e.g., potentially reducing neighboring problems sometimes associated with quad tree structures).

FIGS. 8a-8c depict example user views of example graphical displays on a device. According to an example embodiment, techniques discussed herein may provide a location matching system. For example, as shown in FIGS. 8a-8c, a user may snap a photo of a landmark. For example, a device 802 may correspond to the receiving device 122 discussed above with regard to FIGS. 1 and 2. As shown in FIG. 8a, an image of a landmark 804 may be displayed for a user (e.g., after the user 120 has snapped a photo of the landmark). The digital image associated with the photo may then be matched against other digital images in a spatial index, as discussed above.

For example, a photo query 806 may be submitted for determining matching images. For example, matches with a set of digital images (e.g., photos contributed by other users) that have tags associated with them may be obtained. According to an example embodiment, a tag ranking value as discussed herein may be applied to provide a relatively small set of relevant, meaningful tags from a "soup of tags" associated with a match graph, for example, determined at least partially in accordance with techniques discussed in U.S. patent application Ser. No. 12/969,610, as discussed above (e.g., with regard to the entity matching engine 178, in conjunction with the tag relevance manager 102). As shown in FIG. 8b, the image of the landmark 804 may be associated with labels "Seattle" 808 and "Space Needle" 810.

As shown in FIG. 8c, a keyword query 812 associated with the label "Space Needle" 810 may return information associated with tags that may be determined as relevant information, based on example techniques as discussed herein. For example, a displayed text block 814 indicates address information associated with the landmark 804, a displayed text block 816 indicates address information associated with sales associated with the landmark 804, a displayed text block 818 indicates address information associated with an administrative office associated with the landmark 804, and a displayed text block 820 indicates city and state information associated with the landmark 804.

Example techniques discussed herein may thus provide sets of relevant keywords (tags) for any given location, at any given scope in the world where user-contributed and geo-located tags are available. For example, this data may then be served in real-time to clients through a web service. Example techniques discussed herein may also be used to rank a set of tags from a match graph of a location-matched query photo, as discussed above.

Customer privacy and confidentiality have been ongoing considerations in online environments for many years. Thus, a service for determining relevant tags may provide user information regarding risks associated with the user providing personal information, for example, for use in association with a user profile. An example service for determining relevant tags may offer options for a potential user to use the service on individual one-time sessions in lieu of a subscription in which the user information may be persistently stored for retrieval upon subsequent requests for relevant tags. A service for determining relevant tags may also request permission from potential users before sharing user information with sponsors such as companies providing advertising. An example service for determining relevant tags may inform a potential user that he/she may receive a list of relevant tags, and that the user may decline to provide personal information other than an online address (i.e., as a target for transmitting the tags) and any other optional information that the user may elect to provide (e.g., a gender, an age range, an income range, an ethnicity, personal preferences permission), for use in updating/upgrading logic for determining relevant tags for all users of the service.

An example service for determining relevant tags may request an email address for sending an email to confirm permission before user personal information is entered into the system, to ensure that the user is informed of potential risks of electronically stored personal/private information. Further, authentication techniques may be included in order for the user to continue to use the service for determining relevant tags. For example, a user identifier and password may be requested for future access to the system. As another example, an authorized fingerprint or audio identification (e.g., via voice recognition) may be requested for the access. Additionally, access to networked elements of the system may be provided via secured connections (or hardwired connections), and firewalls may be provided to minimize risk of potential hacking into the system.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital versatile disk (DVD), etc.) or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a tag relevance manager embodied via executable instructions stored on a computer-readable storage medium, the tag relevance manager including:
   a tag collector that obtains a plurality of tags associated with a plurality of geographic locations, each tag indicating one or more attributes associated with an entity associated with one of the geographic locations;
   a geographic scope component that obtains a first geographic scope indicating a first hierarchical geographic analysis level associated with the plurality of geographic locations;
   a first frequency component that obtains a first relative frequency of occurrence of a first one of the tags based on a first bounded geographic area that includes a first one of the geographic locations that is associated with the first one of the tags;
   a second frequency component that obtains a second relative frequency of occurrence of the first one of the tags based on a second bounded geographic area that is larger than the first bounded geographic area, the second bounded geographic area surrounding the first one of the geographic locations that is associated with the first one of the tags,
   the first bounded geographic area including at least a first portion of the plurality of geographic locations, and
   the second bounded geographic area including at least a second portion of the plurality of geographic locations; and
   a tag ranking component that determines, via a device processor, a first locale ranking value associated with the first tag indicating a relevance of the first tag based on the first geographic scope, the first and second relative frequencies of occurrence, and a locale associated with the first bounded geographic area.

2. The system of claim 1, wherein:
   the entity associated with the one of the geographic locations includes an indicator of a digital image associated with the one of the geographic locations, and
   the one or more attributes associated with the each tag include one or more of:
   a name associated with a posting user of one or more of the digital images,
   a description of a camera,
   a description of an event,
   an description of a mood,
   a name of a color,
   a name associated with an item depicted in one or more of the digital images,
   a name associated with a group of items depicted in one or more of the digital images, or
   a date associated with one or more of the digital images.

3. The system of claim 1, further comprising:
a rank storage component that initiates storage of the first locale ranking value with an indicator of the first tag in a quad tree structure that includes a plurality of other locale ranking values and indicators of associated tags, stored based on relevance based on the first geographic scope.

4. The system of claim 1, further comprising:
a rank storage component that initiates storage of the first locale ranking value with an indicator of the first tag in a database that includes a plurality of other locale ranking values and indicators of associated tags, stored based on relevance, based on the first geographic scope.

5. The system of claim 4, wherein:
the database includes a plurality of entities associated with the plurality of geographic locations, and
each of the plurality of tags is associated with one or more of the plurality of entities.

6. The system of claim 4, further comprising:
a request receiving component that receives a request for a list of tags associated with one of the plurality of geographic locations, based on a request geographic scope;
a search request component that initiates a search of the database based on the one of the plurality of geographic locations and the request geographic scope; and
a list receiving component that receives the list of tags, ordered based on relevance within the request geographic scope, based on tag locale rankings associated with each of the tags included in the list of tags.

7. The system of claim 6, wherein:
the request receiving component receives the request for a list of tags associated with one of the plurality of geographic locations, based on a request geographic scope and a request image associated with the one of the one of the plurality of geographic locations;
the search request component initiates a search of the database based on the one of the plurality of geographic locations, a match of the request image with other images, and the request geographic scope; and
the list receiving component receives the list of tags based on receiving one or more indicators associated with matched images associated with one or more of the tags included in the received list, the matched images associated with the plurality of geographic locations.

8. The system of claim 1, wherein:
the second bounded geographic area includes the first bounded geographic area.

9. The system of claim 1, wherein:
the second bounded geographic area geographically substantially surrounds the first bounded geographic area.

10. The system of claim 1, wherein:
the first relative frequency of occurrence of the first one of the tags is determined in accordance with $$f_{X_A} = \frac{n_{X_A}}{N_A} = \frac{n_{X_A}}{\sum_Y n_{Y_A}}$$

wherein
X represents the first one of the tags,
A represents the first bounded geographic area,
$n_{X_A}$ represents a number of independent occurrences of the first tag X in A,
$N_A$ represents a total number of independent tags in A, and
$f_{X_A}$ represents the first relative frequency of occurrence.

11. The system of claim 1, wherein:
the first locale ranking value is determined in accordance with $$S_{X_A} = \frac{f_{X_A}}{f_{X_{A+}}}$$

wherein
X represents the first one of the tags,
A represents the first bounded geographic area,
A+ represents the second bounded geographic area,
$S_{X_A}$ represents the first locale ranking value,
$f_{X_A}$ represents the first relative frequency of occurrence, and
$f_{X_{A+}}$ represents the second relative frequency of occurrence.

12. The system of claim 1, further comprising:
a comparable ranking component that determines a globally comparable ranking value in accordance with $$S'_{X_A} = S_{X_A} \cdot \frac{N_A}{N}$$

wherein
X represents the first one of the tags,
A represents the first bounded geographic area,
$S_{X_A}$ represents the first locale ranking value,
$N_A$ represents a total number of tags in A,
N represents an average number of tags per quadkey tile at the first geographic scope, $$\frac{N_A}{N}$$

represents a density factor, and
$S'_{X_A}$ represents the globally comparable ranking value.

13. A method comprising:
receiving a request that includes an indicator associated with a request geographic location and a request geographic scope;
initiating, via a device processor, a search of a database based on the request geographic location and the request geographic scope; and
receiving a list of one or more tags associated with the request geographic location, ordered based on relevance within the request geographic scope, based on tag locale rankings associated with each of the tags included in the list of tags, the tag locale rankings based on comparisons of relative frequencies of occurrence of the tags, based on first bounded geographic areas, compared with second relative frequencies of occurrence of the tags based on second bounded geographic areas that are respectively larger than the first bounded geographic areas, the request geographic scope indicating one of a plurality of hierarchical geographic analysis levels associated with a plurality of geographic locations,
each first bounded geographic area including at least a first portion of the associated plurality of geographic locations, and
each second bounded geographic area including at least a second portion of the associated plurality of geographic locations.

14. The method of claim 13, wherein:
receiving the request includes receiving a request that includes a request entity associated with the request geographic location and the indicator associated with the request geographic scope, and initiating the search of the database includes initiating the search of the database based on the request geographic scope, the request entity, and the request geographic location, the method further comprising:

receiving one or more indicators of entities associated with a match to the request entity and the request geographic location, wherein receiving the list of tags includes receiving the list of tags associated with the one or more indicators of entities, ordered based on relevance within the request geographic scope, based on tag locale rankings associated with each of the tags included in the list of tags.

15. The method of claim 14, wherein:

the entity associated with the one of the geographic locations includes an indicator of a digital image associated with the one of the geographic locations, and the one or more attributes associated with the each tag include one or more of:

a name associated with a posting user of one or more of the digital images, a description of a camera, a description of an event, a description of a mood, a name of a color, a name associated with an item depicted in one or more of the digital images, a name associated with a group of items depicted in one or more of the digital images, one or more names of people, or a date associated with one or more of the digital images.

16. The method of claim 13, wherein:

the database includes at least one quad tree structure that stores tags associated with a first store geographic scope in a quadkey tile associated with the first store geographic scope.

17. The method of claim 13, wherein:

the database includes at least one quad tree structure that stores locale ranking values and indicators of associated tags, stored based on relevance, based on associated geographic scope.

18. A computer program product tangibly embodied on a computer-readable storage medium and including executable code that, when executed, causes at least one data processing apparatus to:

receive a user request for a list of one or more attributes associated with a geographic location and a geographic scope;

send a device request that includes the user request for the list and indicators associated with the geographic location and the geographic scope; and receive the list of attributes associated with the geographic location, ordered based on relevance within the geographic scope, based on attribute locale rankings associated with each of the attributes included in the list of attributes, the attribute locale rankings based on comparisons of relative frequencies of occurrence of the attributes, based on first bounded geographic areas, compared with second relative frequencies of occurrence of the attributes based on second bounded geographic areas that are respectively larger than the first bounded geographic areas, the geographic scope indicating one of a plurality of hierarchical geographic analysis levels associated with a plurality of geographic locations, each first bounded geographic area including at least a first portion of the associated plurality of geographic locations, and each second bounded geographic area including at least a second portion of the associated plurality of geographic locations.

19. The computer program product of claim 18, wherein the executable code is configured to cause the at least one data processing apparatus to:

initiate a display of the list of attributes associated with the geographic location, ordered based on relevance within the geographic scope.

20. The computer program product of claim 18, wherein the executable code is configured to cause the at least one data processing apparatus to:

receive the user request based on receiving the user request for a list of one or more attributes associated with the geographic scope, a request digital image, and the geographic location;

send the device request based on sending the device request that includes the user request for the list and indicators associated with the geographic scope, the request digital image, and the geographic location; and receive the list of attributes associated with the geographic location and the request digital image, ordered based on relevance within the geographic scope, based on attribute locale rankings associated with each of the attributes included in the list of attributes, the attribute locale rankings based on comparisons of relative frequencies of occurrence of the attributes, based on the first bounded geographic areas, compared with second relative frequencies of occurrence of the attributes based on the second bounded geographic areas.

* * * * *

UNITED STATES PATENT AND TRADEMARK OFFICE
CERTIFICATE OF CORRECTION

PATENT NO. : 8,429,156 B2  Page 1 of 1
APPLICATION NO. : 13/162930
DATED : April 23, 2013
INVENTOR(S) : Buchmueller et al.

It is certified that error appears in the above-identified patent and that said Letters Patent is hereby corrected as shown below:

In the Claims
In column 21, line 35, in Claim 7, after "the" delete "one of the".

Signed and Sealed this
Seventeenth Day of February, 2015

Michelle K. Lee
*Deputy Director of the United States Patent and Trademark Office*